United States Patent [19]

Gross et al.

[11] Patent Number: 5,761,090
[45] Date of Patent: *Jun. 2, 1998

[54] EXPERT SYSTEM FOR TESTING INDUSTRIAL PROCESSES AND DETERMINING SENSOR STATUS

[75] Inventors: Kenneth C. Gross, Bolingbrook; Ralph M. Singer, Naperville, both of Ill.

[73] Assignee: The University of Chicago, Chicago, Ill.

[*] Notice: The term of this patent shall not extend beyond the expiration date of Pat. No. 5,459,675.

[21] Appl. No.: 541,602

[22] Filed: Oct. 10, 1995

[51] Int. Cl.⁶ .................................................. H03K 19/00
[52] U.S. Cl. .......................... 364/551.01; 395/50; 395/67
[58] Field of Search ........................... 364/551.01, 185, 364/492; 340/635, 825.06, 517; 73/618, 628, 649; 74/DIG. 7; 395/904, 50, 67, 77

[56] References Cited

U.S. PATENT DOCUMENTS

| | | |
|---|---|---|
| 3,710,082 | 1/1973 | Sloane et al. . |
| 3,848,115 | 11/1974 | Sloane et al. . |
| 4,060,716 | 11/1977 | Pekrul et al. . |
| 4,133,039 | 1/1979 | Eichenlaub . |
| 4,215,340 | 7/1980 | Lejon . |
| 4,275,447 | 6/1981 | Ruiz . |
| 4,292,129 | 9/1981 | Barry . |
| 4,399,095 | 8/1983 | Morris . |
| 4,435,751 | 3/1984 | Hori et al. . |
| 4,598,271 | 7/1986 | Wägli et al. . |
| 4,611,197 | 9/1986 | Sansky . |
| 4,627,954 | 12/1986 | Leroy et al. . |
| 4,658,245 | 4/1987 | Dye et al. . |
| 4,697,170 | 9/1987 | Hoekman . |
| 4,707,687 | 11/1987 | Thomas et al. . |
| 4,707,688 | 11/1987 | Thomas . |
| 4,715,000 | 12/1987 | Premerlani . |
| 4,744,242 | 5/1988 | Anderson et al. . |
| 4,758,964 | 7/1988 | Bittner et al. . |
| 4,772,445 | 9/1988 | Nasrallah et al. . |
| 4,783,307 | 11/1988 | Galligan et al. . |
| 4,803,040 | 2/1989 | Gross . |
| 4,816,208 | 3/1989 | Woods et al. . |
| 4,849,741 | 7/1989 | Thomas . |
| 4,923,117 | 5/1990 | Adams et al. . |
| 4,977,390 | 12/1990 | Saylor et al. . |
| 4,990,302 | 2/1991 | Oda et al. . |
| 5,009,833 | 4/1991 | Takeuchi et al. . |
| 5,023,045 | 6/1991 | Watanabe et al. . |
| 5,024,801 | 6/1991 | Impink, Jr. et al. . |
| 5,103,402 | 4/1992 | Morton et al. . |
| 5,140,858 | 8/1992 | Nishimoto et al. . |
| 5,192,493 | 3/1993 | Erin et al. . |
| 5,214,577 | 5/1993 | Sztipanovits et al. . |
| 5,223,207 | 6/1993 | Gross et al. . |
| 5,285,457 | 2/1994 | Funakubo et al. . |
| 5,319,572 | 6/1994 | Wilhelm et al. . |
| 5,392,320 | 2/1995 | Chao . |
| 5,459,675 | 10/1995 | Gross et al. ............... 364/492 |

OTHER PUBLICATIONS

"On–Line Signal Validation and Feedback Control in a Nuclear Reactor," Ray, et al., pp. 38.01–38.09, Mar. 21, 1983.

(List continued on next page.)

Primary Examiner—Emanuel T. Voeltz
Assistant Examiner—Thomas Peeso
Attorney, Agent, or Firm—Foley & Lardner

[57] ABSTRACT

A method and system for monitoring both an industrial process and a sensor. The method and system include determining a minimum number of sensor pairs needed to test the industrial process as well as the sensor for evaluating the state of operation of both. The technique further includes generating a first and second signal characteristic of an industrial process variable. After obtaining two signals associated with one physical variable, a difference function is obtained by determining the arithmetic difference between the pair of signals over time. A frequency domain transformation is made of the difference function to obtain Fourier modes describing a composite function. A residual function is obtained by subtracting the composite function from the difference function and the residual function (free of non-white noise) is analyzed by a statistical probability ratio test.

20 Claims, 14 Drawing Sheets

Detailed System Structure

OTHER PUBLICATIONS

"Signal Validation with Control Room Information—Processing Computers," Belblidia, et al., Progress in Nuclear Energy, vol. 12, No. 10, pp. 551–558, 1985.

"Expert Systems Application to Plant Diagnosis and Sensor Data Validation," Hashemi, et al., Power Plant Dynamics, Control & Testing Symposium, 6th Proceedings, Apr. 14–16, 1986, Knoxville, Tenn.

"An Expert System for Real–Time Diagnostics and Control," Christie, et al., ANS Topical Meeting on Computer Applications for Nuclear Power Plant Operation and Control, Sep. 1985, pp. 671–676.

"Knowledge–Based Systems in Process Fault Diagnosis," Sudduth, Nuclear Engineering and Design, vol. 112, 1989, pp. 195–209.

"Condition Monitoring of Machinery Using Motor Current Signature Analysis (MCSA)," Kryter, Sep. 11–14, 1989.

"Spectrum–Transformed Sequential Testing Method for Signal Validation Applications," Gross, et al., 8th Power Plant Dynamics, Control & Testing Symp., Knoxville, Tenn., May 1992.

"Sensor failure detection in dynamical systems by Kalman filtering methodology," Turkcan, Netherlands Energy Research Foundation, The Netherlands & O. Ciftcioglu, Istanbul Technical University, Turkey, Dynamics and Control in Nuclear Power Stations, BNES, London, 1991, pp. 133–139.

"Plant Monitoring and Signal Validation at HFIR," Mullens, Oak Ridge National Laboratory, Instrumentation & Controls Div., Oak Ridge, Tenn., pp. 2.01–2.12, May 19–24, 1991.

"An Expert System for Sensor Data Validation & Malfunction Detection," Hashani, et al., presented at American Nuclear Society Topical Meeting, Aug. 31–Sep. 2, 1987, Snowbird, Utah.

"On–Line Test of Signal Validation Software on the Lobi–MOD2 Facility in Ispra, Italy," Prock et al., Nuclear Technology, vol. 97, Jan. 1992, pp. 52–62.

"Spike Energy in Fault Analysis/Machine Condition Monitoring," Shea et al.

"Loose Part Monitor Sensor Validation, Impact Detection, and Characterization," Allen, Nuclear Power Journal, May–Jun. 1989, pp. 80, 82, 84 & 91.

"Reactor Operations" Artificial Intelligence Applications to Improve Nuclear Plant Operations, Quallis, et al., 1988 Winter Meeting, Washington, D.C., International Conference on Nuclear Fission Fifty Years of Process in Energy Security.

"Control and Instrumentation," Upadhyaya, Nuclear Safety, vol. 26, No. 1, Jan.–Feb. 1985, pp. 32–42.

"A Methodology for the Design and Analysis of a Sensor Failure Detection Network," Chou, et al., Nuclear Technology, vol. 101, Jan. 1993, pp. 101–109.

"Validation of Smart Sensor Technologies for Instrument Calibration Reduction in Nuclear Power Plants," Hashemain, et al., NUREG/CR–5903, Jan. 1993, pp. i–ix and 1–154.

"Intelligent Interfaces to Expert Systems Illustrated by a Programmable Signal Validation System," Frogner, Expert Systems Application for the Electric Power Industry, vol. 1, 1991, pp. 243–256.

"Validation of Critical Signals for the Safety Parameter Display System," NP–5066M, Research Project 2292–1, Final Report, Apr. 1987.

"Fault–Tolerant Plant Operations Systems I: A Tutorial on Concepts," Dove (NASA), pp. 370–374, Jun. 9–13, 1985.

"Fault–Tolerant Plant Operations Systems II: Reports on Experience in Implementation," Blancaflor, et al., pp. 375–379, Jun. 9–13, 1985.

"Microcomputer–Based Fault Detection Using Redundant Sensors," Polenta, et al., IEEE Transactions on Nuclear Science, vol. 24, No. 5, Sep. Oct. 1988, pp. 905–912.

"Construction and Evaluation of Fault Detection Network for Signal Validation,"Ning et al., IEEE Transactions on Nuclear Science, vol. 39, No. 4, pp. 943–947.

"Early Fault Detection and Diagnosis in Finnish Nuclear Power Plants," Eklund, et al., Progress Nuclear Energy, 1988, vol. 21, pp. 479–487.

"Fault Detection Method Using Power Supply Spectrum Analysis," Electronics Letters 27th Sep. 1990, vol. 26, No. 28.

"Process Hypercube Comparison for Signal Validation," Holbert, IEEE Transactions on Nuclear Science, vol. 38, No. 2, Apr. 1991, pp. 803–811.

"Algorithm–Based Fault Detection for Signal Processing Applications," Reddy, et al., IEEE Transactions on Computers, vol. 39, No. 10, Oct. 1990, pp. 1304–1308.

"Signal Validation Techniques and Power Plant Applications," Divakaruni, et al., Progress in Nuclear Energy, vol. 22, pp. 181–213, 1988.

"Power Signal Validation for Taiwan Research Reactor," Lee, et al., Nuclear Technology, vol. 84, Jan. 1989, pp. 7–13.

"Instrument Fault Detection in a Pressurized Water Reactor Pressurizer," Clark, et al., Nuclear Technology, vol. 56, Jan. 1982, pp. 23–32.

"An Integrated Signal Validation System for Nuclear Power Plants," Holbert, et al., Nuclear Technology, vol. 92, Dec. 1990, pp. 411–427.

"Sensor Fault Monitoring and Process Diagnostics," Upadhyaya, et al., Tennessee Industries Week, vol. 1, Aug. 16–18, 1989.

"Reactor Coolant Pump Surveillance Using Sequential Probability Ratio Tests," K.C. Gross, K.E. Humenik and L. Braun, Trans. Am. Nucl. Soc. (60), Nov. 1989.

"Sequential Probability Ratio Tests for Reactor Signal Validation and Sensor Surveillance Applications," K.E. Humenik and K.C. Gross, Nucl. Sci. and Eng. (105), pp. 383–390, Aug. 1990.

"Reactor Coolant Pump Monitoring and Diagnostic System," R.M. Singer, K.C. Gross, K.E. Humenik and M. Walsh, Proc. 2nd. Intnl. Machinery Monitoring and Diagnostic Conf., Los Angeles, Calif., Oct. 1990.

"Fourier Series Approximation to Randomize Data Used by Sequential Probability Ratio Tests," K.E. Humenik and K.C. Gross, Intnl. Topical Mtg. on Advances in Math, Computations, and Reactor Physics, Pittsburgh, Pa., Apr. 1991.

"Pumping Systems Fault Detection and Diagnostics Utilizing Pattern Recognition and Fuzzy Inference Techniques," R.M. Singer, K.C. Gross, K.E. Humenik and M.K. Walsh, Proc. 4th Intnl. Conf. on Industrial and Engineering Applications of AI and Expert Systems, Kauai, Hawaii, Jun. 1991.

"Expert System for Reactor Coolant Pump Surveillance," K.C. Gross, R.M. Singer, K. Humenik, and M. Walsh, Proc. ANS Intnl. Fast Reactor Safety Conf., vol. III pp. 359–368, Aug. 1990.

EXPERT SYSTEM FOR TESTING INDUSTRIAL PROCESSES AND DETERMINING SENSOR STATUS

The United States Government has rights in this invention pursuant to Contract W-31-109-ENG-38 between the U.S. Department of Energy and the University of Chicago.

The present invention is concerned generally with an expert system and method for reliably monitoring industrial processes using a set of sensors. More particularly, the invention is concerned with an expert system and method for establishing a network of industrial sensors for parallel monitoring of industrial devices. The expert system includes a network of highly sensitive pattern recognition modules for automated parameter surveillance using a sequential probability ratio test.

Conventional parameter-surveillance schemes are sensitive only to gross changes in the mean value of a process, or to large steps or spikes that exceed some threshold limit check. These conventional methods suffer from either large numbers of false alarms (if thresholds are set too close to normal operating levels) or a large number of missed (or delayed) alarms (if the thresholds are set too expansively). Moreover, most conventional methods cannot perceive the onset of a process disturbance or sensor deviation which gives rise to a signal below the threshold level for an alarm condition.

In another conventional monitoring method, the Sequential Probability Ratio Test ("SPRT") has found wide application as a signal validation tool in the nuclear reactor industry. Two features of the SPRT technique make it attractive for parameter surveillance and fault detection: (1) early annunciation of the onset of a disturbance in noisy process variables, and (2) the SPRT technique has user-specifiable false-alarm and missed-alarm probabilities. One important drawback of the SPRT technique that has limited its adaptation to a broader range of applications is the fact that its mathematical formalism is founded upon an assumption that the signals it is monitoring are purely Gaussian, independent (white noise) random variables.

It is therefore an object of the invention to provide an improved method and system for continuous evaluation and/or modification of industrial processes and/or sensors monitoring the processes.

It is also an object of the invention to provide an improved method and system for automatically configuring a set of sensors to monitor an industrial process.

It is another object of the invention to provide a novel method and system for statistically processing industrial process signals having virtually any form of noise signal.

It is a further object of the invention to provide an improved method and system employing identical pairs of sensors for obtaining redundant readings of physical processes from an industrial process.

It is still an additional object of the invention to provide a novel method and system utilizing a plurality of signal pairs to generate difference functions to be analyzed for alarm information.

It is still a further object of the invention to provide an improved method and system including a plurality of single sensors for each industrial device or process for providing a real signal characteristic of a process and further providing a predicted sensor signal allowing formation of a difference signal between the predicted and real signal for subsequent analysis.

It is also an object of the invention to provide a novel method and system wherein difference functions are formed from pairs of sensor signals operating in parallel to monitor a plurality of like industrial devices.

It is yet an additional object of the invention to provide an improved method and system utilizing variable and multiple pairs of sensors for determining both sensor degradation and industrial process status.

It is still another object of the invention to provide a novel method and system having a plurality of sensors analytically configured by an expert system to establish the minimum array of coupled sensors needed to monitor each sensor as well as the industrial process or devices.

An expert system has been developed that continuously monitors digitized signals from a set of sensors which are measuring a variety of physical variables (e.g., temperature, pressure, radiation level, vibration level, etc.). The expert system employs a sensitive pattern-recognition technique, the sequential probability ratio test ("SPRT") technique for early annunciation of sensor operability degradation. A SPRT module can monitor output from two identical sensors and determine if the statistical quality of the noise associated with either signal begins to change. In applications involving two or more industrial devices operated in parallel and equipped with identical sensors, a SPRT module applied to pairs of sensors monitoring the same physical process on the respective devices will provide sensitive annunciation of any physical disturbance affecting one of the devices. If each industrial device had only one sensor, it would not be possible for the SPRT technique to distinguish between equipment degradation and degradation of the sensor itself. In this application the primary benefit of the SPRT method would derive from its very early annunciation of the onset of the disturbance. Having this valuable information, additional diagnosis can then be performed to check the performance and calibration status of the sensor and to identify the root-cause of the signal anomaly.

For cases where each industrial device is equipped with multiple, redundant sensors, one can apply SPRT modules to pairs of sensors on each individual device for sensor-operability verification. In this case the expert system provides not only early annunciation of the onset of a disturbance, but also can distinguish between equipment degradation and degradation of its sensors. Moreover, when the expert system determines that the cause of the discrepant signals is due to a degraded sensor, it can identify the specific sensor that has failed.

In a simple generic application involving a single industrial device equipped with triply-redundant sensors for measurement of two physical variables, the expert system first identifies the minimum unique set of signal pairs that will be needed for the network of interacting SPRT modules. Further, the system can operate using two industrial devices working in parallel (e.g., jet engines, propeller drive motors on a ship, turbomachinery in an industrial plant, etc.). Again the expert system identifies the pair-wise sensor combinations that it uses subsequently in building the conditional branching hierarchy for the SPRT-module configuration.

Other objects, features, alternative forms and advantages of the present invention will be readily apparent from the following description of the preferred embodiments thereof, taken in conjunction with the accompanying drawings described below.

DETAILED DESCRIPTION OF PREFERRED EMBODIMENTS

Figure 1:
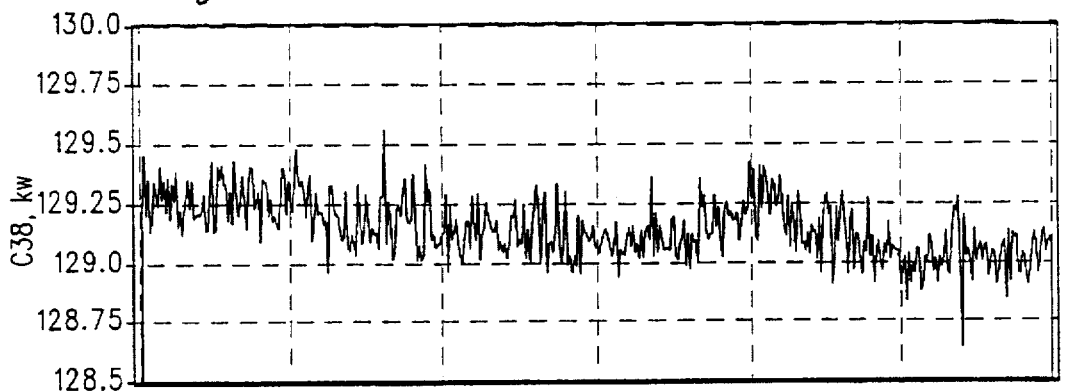
FIG. 1 illustrates the specified output of a pump's power output over time.

In a method of the invention signals from industrial process sensors can be used to annunciate, modify or terminate degrading or anomalous processes. The sensor signals are manipulated to provide input data to a statistical analysis technique, such as a process entitled Sequential Probability Ratio Test ("SPRT"). Details of this process and the invention therein are disclosed in Ser. No. 07/827,776 which is incorporated by reference herein in its entirety. A further illustration of the use of SPRT for analysis of data bases is set forth in U.S. Pat. No. 5,410,422 and copending application of the assignee Ser. No. 08/068,713, also incorporated by reference herein in their entirety. The procedures followed in a preferred methods are shown generally in FIG. 8 and also in FIG. 12. In performing such a preferred analysis of the sensor signals, a dual transformation method is performed, insofar as it entails both a frequency-domain transformation of the original time-series data and a subsequent time-domain transformation of the resultant data. The data stream that passes through the dual frequency-domain, time-domain transformation is then processed with the SPRT procedure, which uses a log-likelihood ratio test. A computer software package, Appendix A, is also attached hereto covering the SPRT procedure and its implementation in the context of, and modified by, the instant invention.

In one preferred embodiment, successive data observations are performed on a discrete process Y, which represents a comparison of the stochastic components of physical processes monitored by a sensor, and most preferably pairs of sensors. In practice, the Y function is obtained by simply differencing the digitized signals from two respective sensors. Let $y_k$ represent a sample from the process Y at time $t_k$. During normal operation with an undegraded physical system and with sensors that are functioning within specifications the $y_k$ should be normally distributed with mean of zero. Note that if the two signals being compared do not have the same nominal mean values (due, for example, to differences in calibration), then the input signals will be pre-normalized to the same nominal mean values during initial operation.

In performing the monitoring of industrial processes, the system's purpose is to declare a first system, a second system, etc., degraded if the drift in Y is sufficiently large that the sequence of observations appears to be distributed about a mean +M or −M, where M is our pre-assigned system-disturbance magnitude. We would like to devise a quantitative framework that enables us to decide between two hypotheses, namely:

$H_1$: Y is drawn from a Gaussian probability distribution function ("PDF") with mean M and variance $\sigma^2$.

$H_2$: Y is drawn from a Gaussian PDF with mean 0 and variance $\sigma^2$.

We will suppose that if $H_1$ or $H_2$ is true, we wish to decide for $H_1$ or $H_2$ with probability $(1-\beta)$ or $(1-\alpha)$, respectively, where $\alpha$ and $\beta$ represent the error (misidentification) probabilities.

From the conventional, well known theory of Wald, the test depends on the likelihood ratio $l_n$, where $$l_n = \frac{\text{The probability of observed sequence } y_1, y_2 \ldots, y_n \text{ given } H_1 \text{ true}}{\text{The probability of observed sequence } y_1, y_2 \ldots, y_n \text{ given } H_2 \text{ true}} \quad (1)$$

After "n" observations have been made, the sequential probability ratio is just the product of the probability ratios for each step:

$$l_n = (PR_1) \cdot (PR_2) \cdot \ldots \cdot (PR_n) \quad (2)$$

or $$l_n = \prod_{i=1}^{i=n} \frac{f(y_i|H_1)}{f(y_i|H_2)} \quad (3)$$

where f(y|H) is the distribution of the random variable y.

Wald's theory operates as follows: Continue sampling as long as $A < l_n < B$. Stop sampling and decide $H_1$ as soon as $l_n \geq B$, and stop sampling and decide $H_2$ as soon as $l_n \leq A$. The acceptance thresholds are related to the error (misidentification) probabilities by the following expressions:

$$A = \frac{\beta}{1-\alpha}, \text{ and } B = \frac{1-\beta}{\alpha} \quad (4)$$

The (user specified) value of a is the probability of accepting $H_1$ when $H_2$ is true (false alarm probability). $\beta$ is the probability of accepting $H_2$ when $H_1$ is true (missed alarm probability).

If we can assume that the random variable $y_k$ is normally distributed, then the likelihood that $H_1$ is true (i.e., mean M, variance $\sigma^2$) is given by:

$$L(y_1, y_2 \ldots, y_n | H_1) = \tag{5}$$

$$\frac{1}{(2\pi)^{n/2}\sigma^n} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

Similarly for $H_2$ (mean 0, variance $\sigma^2$):

$$L(y_1, y_2 \ldots, y_n | H_2) = \frac{1}{(2\pi)^{n/2}\sigma^n} \exp\left(-\frac{1}{2\sigma^2}\sum_{k=1}^{n} y_k^2\right) \tag{6}$$

The ratio of (5) and (6) gives the likelihood ratio $l_n$ $$l_n = \exp\left[-\frac{1}{2\sigma^2}\sum_{k=1}^{n} M(M - 2y_k)\right] \tag{7}$$

Combining (4) and (7), and taking natural logs gives $$\ln\frac{\beta}{1-\alpha} < \frac{-1}{2\sigma^2}\sum_{k=1}^{n} M(M - 2y_k) < \ln\frac{(1-\beta)}{\alpha} \tag{8}$$

Our sequential sampling and decision strategy can be concisely represented as:

If $l_n \leq \ln\frac{\beta}{1-\alpha}$, Accept $H_2$ (9)

If $\ln\frac{\beta}{1-\alpha} < l_n < \ln\frac{1-\beta}{\alpha}$, Continue Sampling (10)

And if $l_n \geq \ln\frac{1-\beta}{\alpha}$, Accept $H_1$ (11)

Following Wald's sequential analysis, it is conventional that a decision test based on the log likelihood ratio has an optimal property; that is, for given probabilities $\alpha$ and $\beta$ there is no other procedure with at least as low error probabilities or expected risk and with shorter length average sampling time.

A primary limitation that has heretofore precluded the applicability of Wald-type binary hypothesis tests for sensor and equipment surveillance strategies lies in the primary assumption upon which Wald's theory is predicated; i.e., that the original process Y is strictly "white" noise, independently-distributed random data. White noise is thus well known to be a signal which is uncorrelated. Such white noise can, for example, include Gaussian noise. It is, however, very rare to find physical process variables associated with operating machinery that are not contaminated with serially-correlated, deterministic noise components. Serially correlated noise components are conventionally known to be signal data whose successive time point values are dependent on one another. Noise components include, for example, auto-correlated (also known as serially correlated) noise and Markov dependent noise. Auto-correlated noise is a known form of noise wherein pairs of correlation coefficients describe the time series correlation of various data signal values along the time series of data. That is, the data $U_1, U_2, \ldots, U_n$ have correlation coefficients $(U_1, U_2), (U_2, U_3), \ldots, (U_{n-1}, U_n)$ and likewise have correlation coefficients $(U_1, U_3)$ $(U_2, U_4)$, etc. If these data are auto-correlated, at least some of the coefficients are non-zero. Markov dependent noise, on the other hand, is a very special form of correlation between past and future data signals. Rather, given the value of $U_k$, the values of $U_n$, n>k, do not depend on the values of $U_j$ where j<k. This implies the correlation pairs $(U_j, U_n)$, given the value $U_k$, are all zero. If, however, the present value is imprecise, then the correlation coefficients may be nonzero. One form of this invention can overcome this limitation to conventional surveillance strategies by integrating the Wald sequential-test approach with a new dual transformation technique. This symbiotic combination of frequency-domain transformations and time-domain transformations produces a tractable solution to a particularly difficult problem that has plagued signal-processing specialists for many years.

Figure 8A:
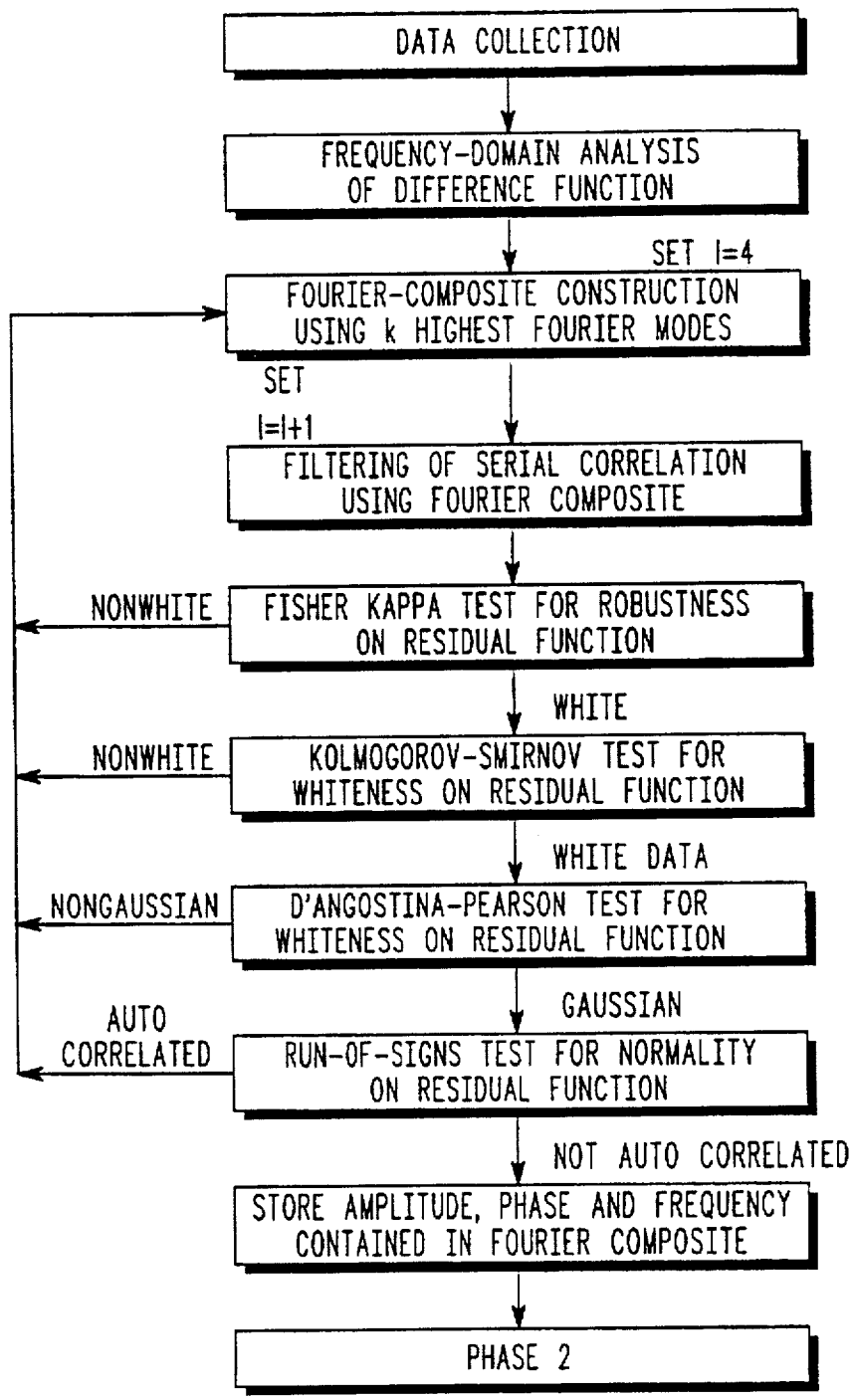
FIG. 8A and B illustrate a schematic functional flow diagram of the invention with FIG. 8A showing a first phase of the method of the invention and FIG. 8B shows the application of the method of the invention.
Figure 8B:
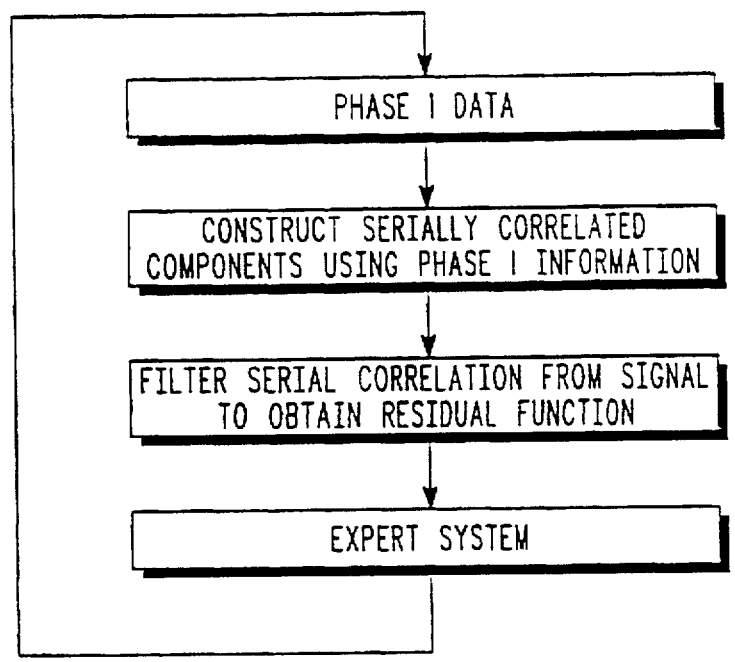

In one preferred embodiment of the method shown in detail in FIG. 8, serially-correlated data signals from an industrial process can be rendered amenable to the SPRT testing methodology described hereinbefore. This is preferably done by performing a frequency-domain transformation of the original difference function Y. A particularly preferred method of such a frequency transformation is accomplished by generating a Fourier series using a set of highest "l" number of modes. Other procedures for rendering the data amenable to SPRT methods includes, for example, auto regressive techniques, which can accomplish substantially similar results described herein for Fourier analysis. In the preferred approach of Fourier analysis to determine the "l" highest modes (see FIG. 8A):

$$Y_t = \frac{\alpha_0}{2} + \sum_{m=1}^{\frac{N}{2}} (a_m \cos \omega_m t + b_m \sin \omega_m t) \tag{12}$$

where $a_0/2$ is the mean value of the series, $a_m$ and $b_m$ are the Fourier coefficients corresponding to the Fourier frequency $\omega_m$, and N is the total number of observations. Using the Fourier coefficients, we next generate a composite function, $X_t$, using the values of the largest harmonics identified in the Fourier transformation of $Y_t$. The following numerical approximation to the Fourier transform is useful in determining the Fourier coefficients $a_m$ and $b_m$. Let $x_j$ be the value of $X_t$ at the jth time increment. Then assuming $2\pi$ periodicity and letting $\omega_m = 2\pi m/N$, the approximation to the Fourier transform yields:

$$a_m = \frac{2}{N}\sum_{j=0}^{N-1} x_j \cos \omega_m j \quad b_m = \frac{2}{N}\sum_{j=0}^{N-1} x_j \sin \omega_m j \tag{13}$$

for $0<m<N/2$. Furthermore, the power spectral density ("PSD") function for the signal is given by $l_m$ where $$l_m = N\frac{a_m^2 + b_m^2}{2} \tag{14}$$

To keep the signal bandwidth as narrow as possible without distorting the PSD, no spectral windows or smoothing are used in our implementation of the frequency-domain transformation. In analysis of a pumping system of the EBR-II reactor of Argonne National Laboratory, the Fourier modes corresponding to the eight highest $l_m$ provide the amplitudes and frequencies contained in $X_t$. In our investigations for the particular pumping system data taken, the highest eight $l_m$ modes were found to give an accurate reconstruction of $X_t$ while reducing most of the serial correlation for the physical variables studied. In other industrial processes, the analysis could result in more or fewer modes being needed to accurately construct the functional behavior of a composite curve. Therefore, the number of modes used is a variable which is iterated to minimize the degree of nonwhite noise for any given application. As noted in FIG. 8A a variety of noise tests are applied in order to remove serially correlated noise.

The reconstruction of $X_t$ uses the general form of Eqn. (12), where the coefficients and frequencies employed are those associated with the eight highest PSD values. This yields a Fourier composite curve (see end of flowchart in FIG. 8A) with essentially the same correlation structure and the same mean as $Y_r$. Finally, we generate a discrete residual function $R_t$ by differencing corresponding values of $Y_t$ and $X_t$. This residual function, which is substantially devoid of serially correlated contamination, is then processed with the SPRT technique described hereinbefore.

In a specific example application of the above referenced methodology, certain variables were monitored from the Argonne National Laboratory reactor EBR-II. In particular, EBR-II reactor coolant pumps (RCPs) and delayed neutron (DN) monitoring systems were tested continuously to demonstrate the power and utility of the invention. All data used in this investigation were recorded during full-power, steady state operation at EBR-II. The data have been digitized at a 2-per-second sampling rate using $2^{14}$ (16,384) observations for each signal of interest.

Figure 2:
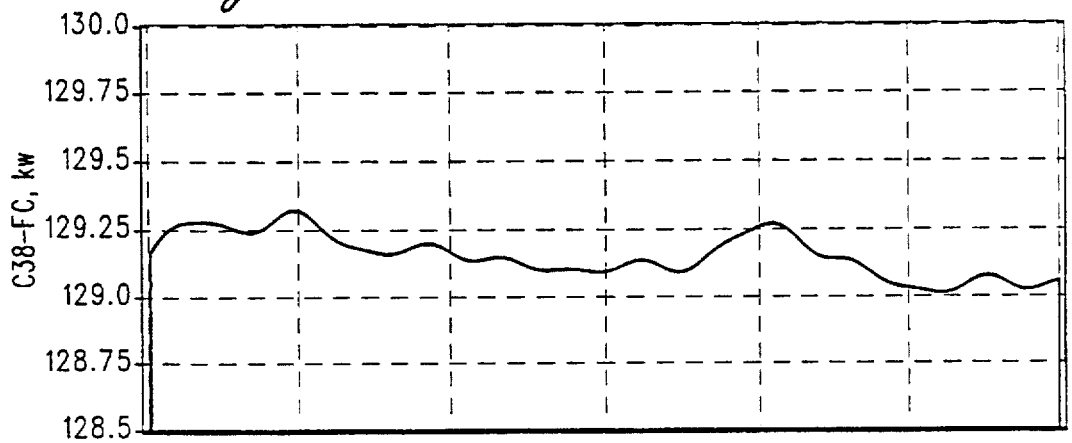
FIG. 2 shows a Fourier composite curve generated using the pump spectral output of FIG. 1.
Figure 3:
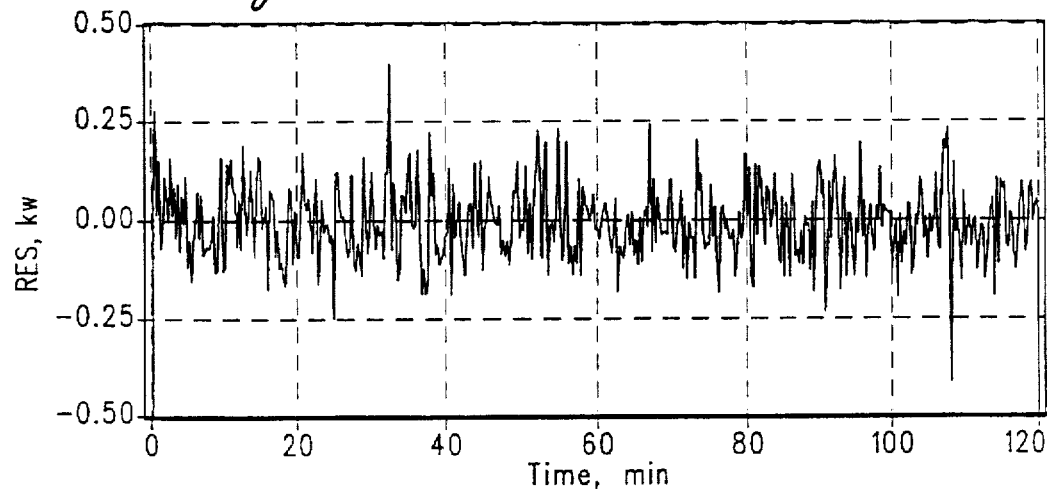
FIG. 3 illustrates a residual function characteristic of the difference between FIGS. 1 and 2.
Figure 4A:
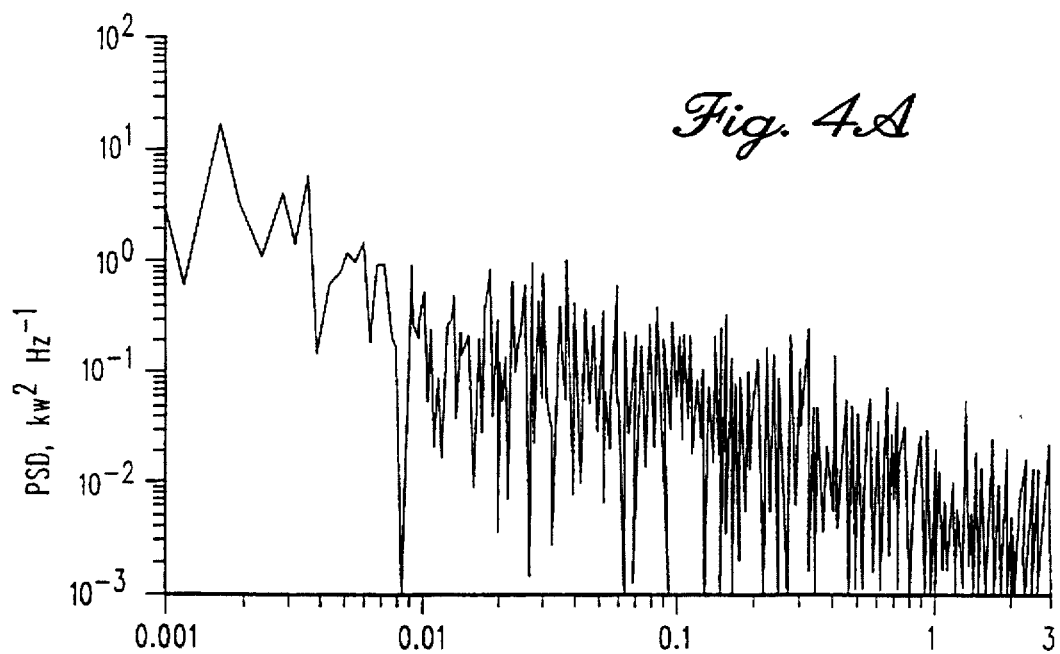
FIG. 4A shows a periodogram of the spectral data of FIG. 1
Figure 4B:
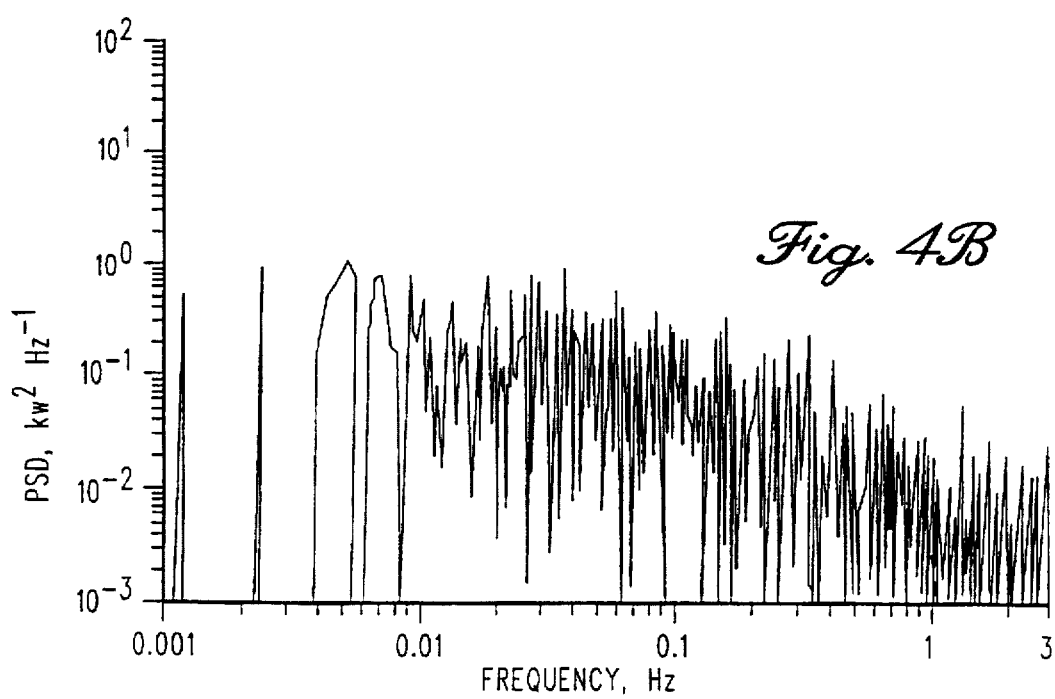
FIG. 4B shows a periodogram of the residual function of FIG. 3.
Figure 5A:
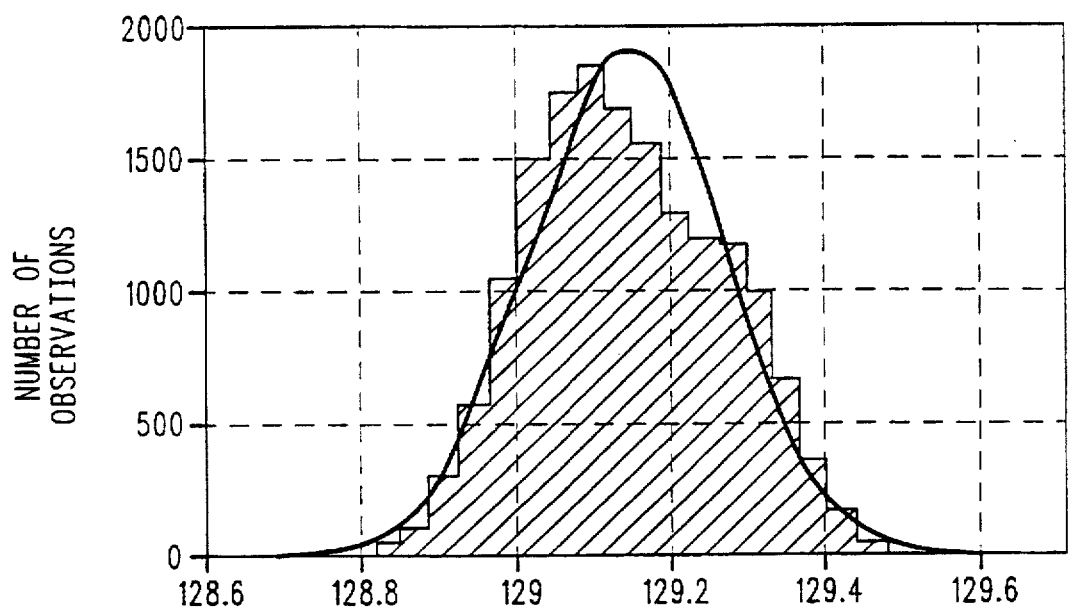
FIG. 5A illustrates a noise histogram for the pump power output of FIG. 1
Figure 5B:
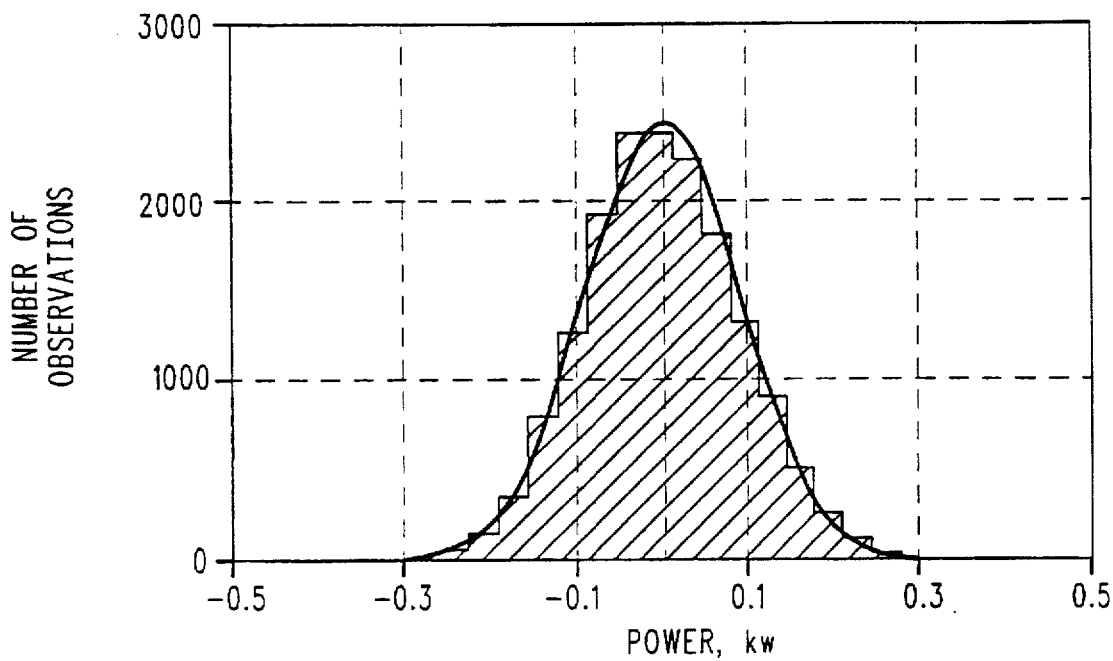
FIG. 5B illustrates a noise histogram for the residual function of FIG. 3.

FIGS. 1–3 illustrate data associated with the preferred spectral filtering approach as applied to the EBR-II primary pump power signal, which measures the power (in kW) needed to operate the pump. The basic procedure of FIG. 8 was then followed in the analysis. FIG. 1 shows 136 minutes of the original signal as it was digitized at the 2-Hz sampling rate. FIG. 2 shows a Fourier composite constructed from the eight most prominent harmonics identified in the original signal. The residual function, obtained by subtracting the Fourier composite curve from the raw data, is shown in FIG. 3. Periodograms of the raw signal and the residual function have been computed and are plotted in FIG. 4. Note the presence of eight depressions in the periodogram of the residual function in FIG. 4B, corresponding to the most prominent periodicities in the original, unfiltered data. Histograms computed from the raw signal and the residual function are plotted in FIG. 5. For each histogram shown we have superimposed a Gaussian curve (solid line) computed from a purely Gaussian distribution having the same mean and variance. Comparison of FIG. 5A and 5B provide a clear demonstration of the effectiveness of the spectral filtering in reducing asymmetry in the histogram. Quantitatively, this decreased asymmetry is reflected in a decrease in the skewness (or third moment of the noise) from 0.15 (raw signal) to 0.10 (residual function).

It should be noted here that selective spectral filtering, which we have designed to reduce the consequences of serial correlation in our sequential testing scheme, does not require that the degree of nonnormality in the data will also be reduced. For many of the signals we have investigated at EBR-II, the reduction in serial correlation is, however, accompanied by a reduction in the absolute value of the skewness for the residual function.

To quantitatively evaluate the improvement in whiteness effected by the spectral filtering method, we employ the conventional Fisher Kappa white noise test. For each time series we compute the Fisher Kappa statistic from the defining equation $$\kappa = \left[ \frac{1}{N} \sum_{k=1}^{N} l(\omega_k) \right]^{-1} l(L) \qquad (15)$$

where $l(\omega_k)$ is the PSD function (see Eq. 14) at discrete frequencies $\omega_k$, and l(L) signifies the largest PSD ordinate identified in the stationary time series.

The Kappa statistic is the ratio of the largest PSD ordinate for the signal to the average ordinate for a PSD computed from a signal contaminated with pure white noise. For EBR-II the power signal for the pump used in the present example has a k of 1940 and 68.7 for the raw signal and the residual function, respectively. Thus, we can say that the spectral filtering procedure has reduced the degree of nonwhiteness in the signal by a factor of 28. Strictly speaking, the residual function is still not a pure white noise process. The 95% critical value for Kappa for a time series with $2^{14}$ observations is 12.6. This means that only for computed Kappa statistics lower than 12.6 could we accept the null hypothesis that the signal is contaminated by pure white noise. The fact that our residual function is not purely white is reasonable on a physical basis because the complex interplay of mechanisms that influence the stochastic components of a physical process would not be expected to have a purely white correlation structure. The important point, however, is that the reduction in nonwhiteness effected by the spectral filtering procedure using only the highest eight harmonics in the raw signal has been found to preserve the pre-specified false alarm and missed alarm probabilities in the SPRT sequential testing procedure (see below). Table I summarizes the computed Fisher Kappa statistics for thirteen EBR-II plant signals that are used in the subject surveillance systems. In every case the table shows a substantial improvement in signal whiteness.

The complete SPRT technique integrates the spectral decomposition and filtering process steps described hereinbefore with the known SPRT binary hypothesis procedure. The process can be illustratively demonstrated by application of the SPRT technique to two redundant delayed neutron detectors (designated DND A and DND B) whose signals were archived during long-term normal (i.e., undegraded) operation with a steady DN source in EBR-II. For demonstration purposes a SPRT was designed with a false alarm rate, $\alpha$, of 0.01. Although this value is higher than we would designate for a production surveillance system, it gives a reasonable frequency of false alarms so that asymptotic values of $\alpha$ can be obtained with only tens of thousands of discrete observations. According to the theory of the SPRT technique, it can be easily proved that for pure white noise (such as Gaussian), independently distributed processes, $\alpha$ provides an upper bound to the probability (per observation interval) of obtaining a false alarm—i.e., obtaining a "data disturbance" annunciation when, in fact, the signals under surveillance are undegraded.

FIGS. 6 and 7 illustrate sequences of SPRT results for raw DND signals and for spectrally-whitened DND signals, respectively. In FIGS. 6A and 6B, and 7A and 7B, respectively, are shown the DN signals from detectors DND-A and DND-B. The steady-state values of the signals have been normalized to zero.

TABLE I

Effectiveness of Spectral Filtering for Measured Plant Signals

| | Fisher Kappa Test Statistic (N = 16,384) | |
|---|---|---|
| Plant Variable I.D. | Raw Signal | Residual Function |
| Pump 1 Power | 1940 | 68.7 |
| Pump 2 Power | 366 | 52.2 |
| Pump 1 Speed | 181 | 25.6 |
| Pump 2 Speed | 299 | 30.9 |
| Pump 1 Radial Vibr (top) | 123 | 67.7 |
| Pump 2 Radial Vibr (top) | 155 | 65.4 |
| Pump 1 Radial Vibr (bottom) | 1520 | 290.0 |
| Pump 2 Radial Vibr (bottom) | 1694 | 80.1 |
| DN Monitor A | 96 | 39.4 |
| DN Monitor B | 81 | 44.9 |
| DN Detector 1 | 86 | 36.0 |
| DN Detector 2 | 149 | 44.1 |
| DN Detector 3 | 13 | 8.2 |

Figure 6A:
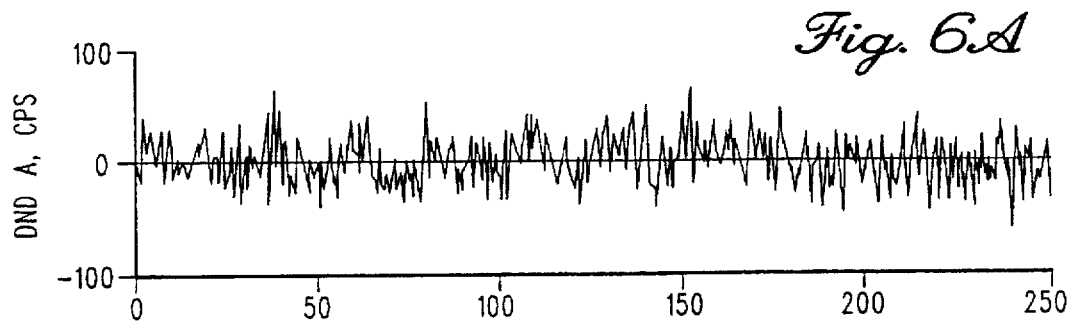
FIG. 6A shows an unmodified delayed neutron detector signal from a first sensor and FIG. 6B is for a second neutron sensor.
Figure 6B:
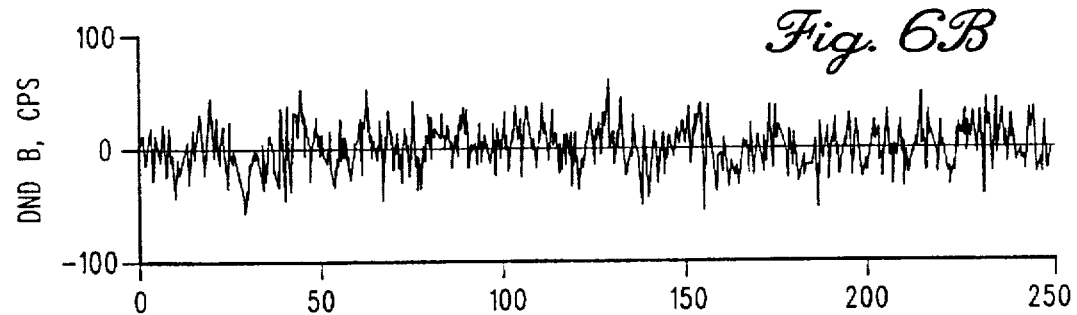
Figure 6C:
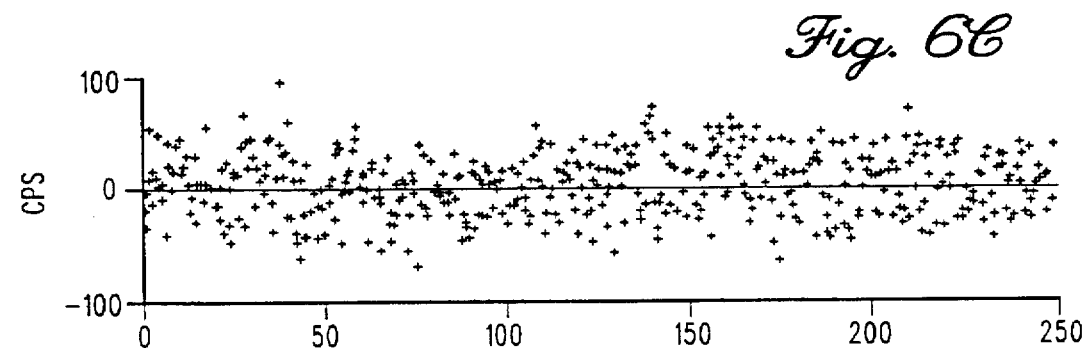
FIG. 6C shows a difference function characteristic of the difference between data in FIG. 6A and 6B and FIG. 6D shows the data output from a SPRT analysis with alarm conditions indicated by the diamond symbols.

Normalization to adjust for differences in calibration factor or viewing geometry for redundant sensors does not affect the operability of the SPRT. FIGS. 6C and 7C in each figure show pointwise differences of signals DND-A and DND-B. It is this difference function that is input to the SPRT technique. Output from the SPRT method is shown for a 250-second segment in FIGS. 6D and 7D.

Figure 6D:
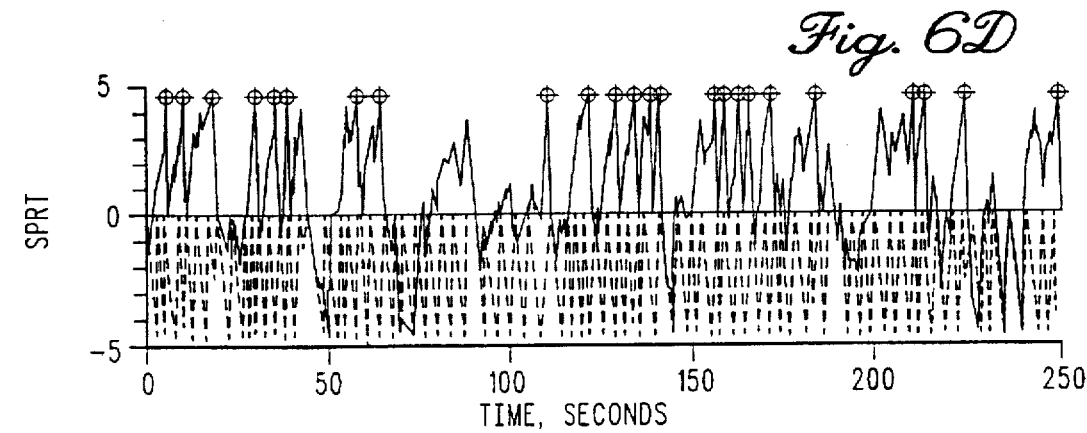
Figure 7A:
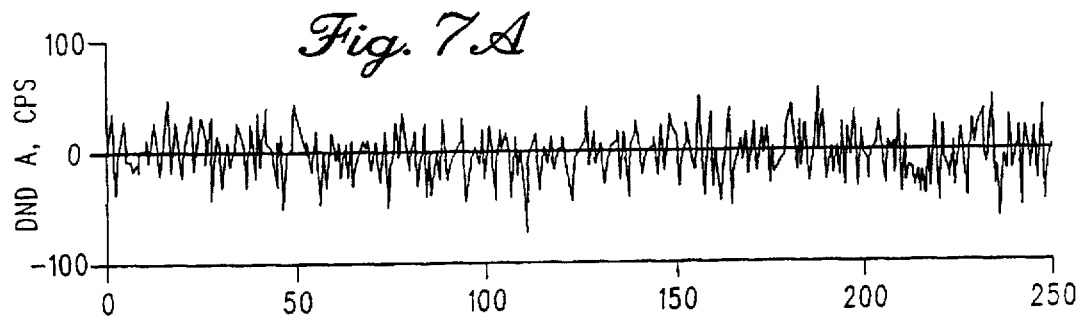
FIG. 7A illustrates an unmodified delayed neutron detector signal from a first sensor and FIG. 7B is for a second neutron sensor.
Figure 7B:
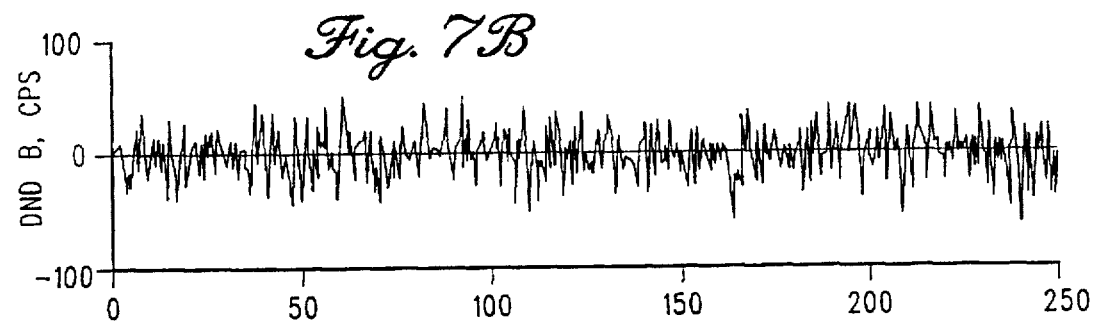
Figure 7C:
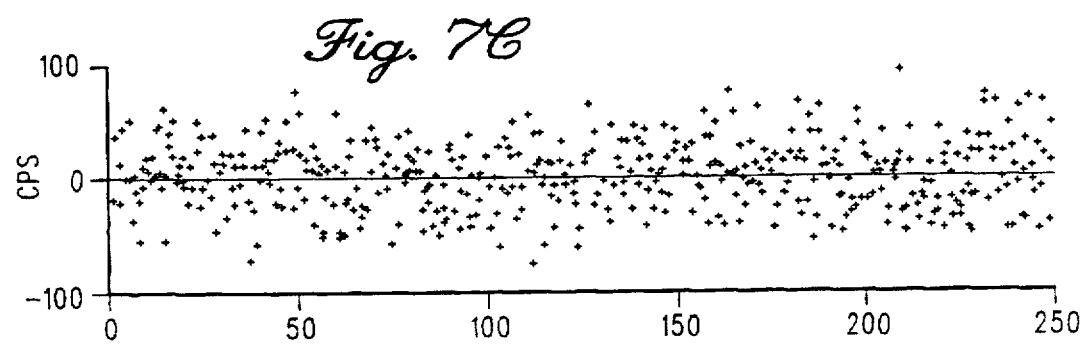
FIG. 7C shows a difference function for the difference between the data of FIG. 7A and 7B and FIG. 7D shows the result of using the instant invention to modify the difference function to provide data free of serially correlated noise to the SPRT analysis to generate alarm information and with alarm conditions indicated by the diamond signals.
Figure 7D:
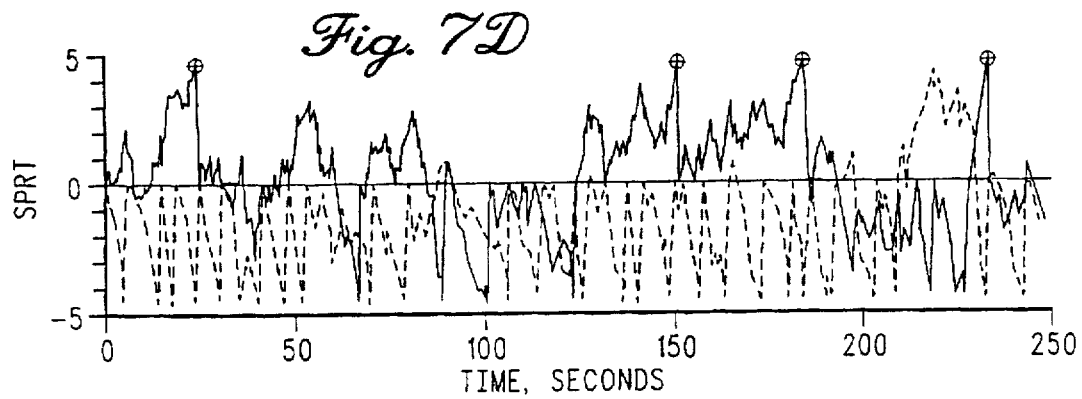

Interpretation of the SPRT output in FIGS. 6D and 7D is as follows: When the SPRT index reaches a lower threshold, A, one can conclude with a 99% confidence factor that there is no degradation in the sensors. For this demonstration A is equal to 4.60, which corresponds to false-alarm and missed-alarm probabilities of 0.01. As FIGS. 6D and 7D illustrate, each time the SPRT output data reaches A, it is reset to zero and the surveillance continues.

If the SPRT index drifts in the positive direction and exceeds a positive threshold, B, of +4.60, then it can be concluded with a 99% confidence factor that there is degradation in at least one of the sensors. Any triggers of the positive threshold are signified with diamond symbols in FIGS. 6D and 7D. In this case, since we can certify that the sensors were functioning properly during the time period our signals were being archived, any triggers of the positive threshold are false alarms.

If we extend sufficiently the surveillance experiment illustrated in FIG. 6D, we can get an asymptotic estimate of the false alarm probability $\alpha$. We have performed this exercise using 1000-observation windows, tracking the frequency of false alarm trips in each window, then repeating the procedure for a total of sixteen independent windows to get an estimate of the variance on this procedure for evaluating the false alarm probability. The resulting false-alarm frequency for the raw, unfiltered, signals is $\alpha$=0.07330 with a variance of 0.000075. The very small variance shows that there would be only a negligible improvement in our estimate by extending the experiment to longer data streams. This value of $\alpha$ is significantly higher than the design value of $\alpha$=0.01, and illustrates the danger of blindly applying a SPRT test technique to signals that may be contaminated by excessive serial correlation.

The data output shown in FIG. 7D employs the complete SPRT technique shown schematically in FIG. 8. When we repeat the foregoing exercise using 16 independent 1000-observation windows, we obtain an asymptotic cumulative false-alarm frequency of 0.009142 with a variance of 0.000036. This is less than (i.e., more conservative than) the design value of $\alpha$=0.01, as desired.

It will be recalled from the description hereinbefore regarding one preferred embodiment, we have used the eight most prominent harmonics in the spectral filtration stage of the SPRT technique. By repeating the foregoing empirical procedure for evaluating the asymptotic values of $\alpha$, we have found that eight modes are sufficient for the input variables shown in Table I. Furthermore, by simulating subtle degradation in individual signals, we have found that the presence of serial correlation in raw signals gives rise to excessive missed-alarm probabilities as well. In this case spectral whitening is equally effective in ensuring that pre-specified missed-alarm probabilities are not exceeded using the SPRT technique.

In a different form of the invention, it is not necessary to have real sensors paired off to form a difference function. Each single sensor can provide a real signal characteristic of an ongoing process and a record artificial signal can be generated to allow formation of a difference function. Techniques such as an auto regressive moving average (ARMA) methodology can be used to provide the appropriate signal, such as a DC level signal, a cyclic signal or other predictable signal. Such an ARMA method is a well-known procedure for generating artificial signal values, and this method can even be used to learn the particular cyclic nature of a process being monitored enabling construction of the artificial signal.

The two signals, one a real sensor signal and the other an artificial signal, can thus be used in the same manner as described hereinbefore for two paired) real sensor signals. The difference function Y is then formed, transformations performed and a residual function is determined which is free of serially correlated noise.

Fourier techniques are very effective in achieving a whitened signal for analysis, but there are other means to achieve substantially the same results using a different analytical methodology. For example, filtration of serial correlation can be accomplished by using the ARMA method. This ARMA technique estimates the specific correlation structure existing between sensor points of an industrial process and utilizes this correlation estimate to effectively filter the data sample being evaluated.

A technique has therefore been devised which integrates frequency-domain filtering with sequential testing methodology to provide a solution to a problem that is endemic to industrial signal surveillance. The subject invention particularly allows sensing slow degradation that evolves over a long time period (gradual decalibration bias in a sensor, appearance of a new radiation source in the presence of a noisy background signal, wear out or buildup of a radial rub in rotating machinery, etc.). The system thus can alert the operator of the incipience or onset of the disturbance long before it would be apparent to visual inspection of strip chart or CRT signal traces, and well before conventional threshold limit checks would be tripped. This permits the operator to terminate, modify or avoid events that might otherwise challenge technical specification guidelines or availability goals. Thus, in many cases the operator can schedule corrective actions (sensor replacement or recalibration; component adjustment, alignment, or rebalancing; etc.) to be performed during a scheduled system outage.

Another important feature of the technique which distinguishes it from conventional methods is the built-in quantitative false-alarm and missed-alarm probabilities. This is quite important in the context of high-risk industrial processes and applications. The invention makes it possible to apply formal reliability analysis methods to an overall system comprising a network of interacting SPRT modules that are simultaneously monitoring a variety of plan variables. This amenability to formal reliability analysis methodology will, for example, greatly enhance the process of granting approval for nuclear-plant applications of the invention, a system that can potentially save a utility millions of dollars per year per reactor.

In another form of the invention, an artificial-intelligence based expert system 100 (see FIG. 12) has been developed for automatically configuring a set of sensors A, B, C and D to perform signal validation and sensor-operability surveillance in industrial applications that require high reliability, high sensitivity annunciation of degraded sensors, discrepant signals, or the onset of process anomalies. This expert system 100 comprises an interconnected network of high sensitivity pattern-recognition modules 102 (see FIGS. 9–11). The modules 102 embody the SPRT methodology described hereinbefore for automated parameter surveillance. The SPRT method examines the noise characteristics of signals from identical pairs of sensors 104 deployed for redundant readings of continuous physical processes from a particular industrial device 106. The comparative analysis of the noise characteristics of a pair of signals, as opposed to their mean values, permits an early identification of a disturbance prior to significant (grossly observable) changes in the operating state of the process. As described in more detail hereinbefore, the SPRT method provides a superior surveillance tool because it is sensitive not only to disturbances in signal mean, but also to very subtle changes in the skewness, bias, or variance of the stochastic noise patterns associated with monitored signals. The use of two or more identical ones of the sensors 104 also permits the validation of these sensors 104, i.e., determines if the indicated disturbance is due to a change in the physical process or to a fault in either of the sensors 104.

For sudden, gross failures of one of the sensors 104 or components of the system 100, the SPRT module 102 would annunciate the disturbance as fast as a conventional threshold limit check. However, for slow degradation that evolves over a long time period (gradual decalibration bias in a sensor, wearout or buildup of a radial rub in rotating machinery, etc.), the SPRT module 102 provides the earliest possible annunciation of the onset of anomalous patterns in physical process variables. The SPRT-based expert system 100 can alert the operator to the incipience of the disturbance long before it would be apparent to visual inspection of strip chart or CRT signal traces, and well before conventional threshold limit checks would be tripped. This permits the operator to terminate or avoid events that might otherwise challenge technical specification guidelines or availability goals, and in many cases, to schedule corrective actions (sensor replacement or recalibration; component adjustment, alignment, or rebalancing; etc.) to be performed during a scheduled system outage.

Figure 12:
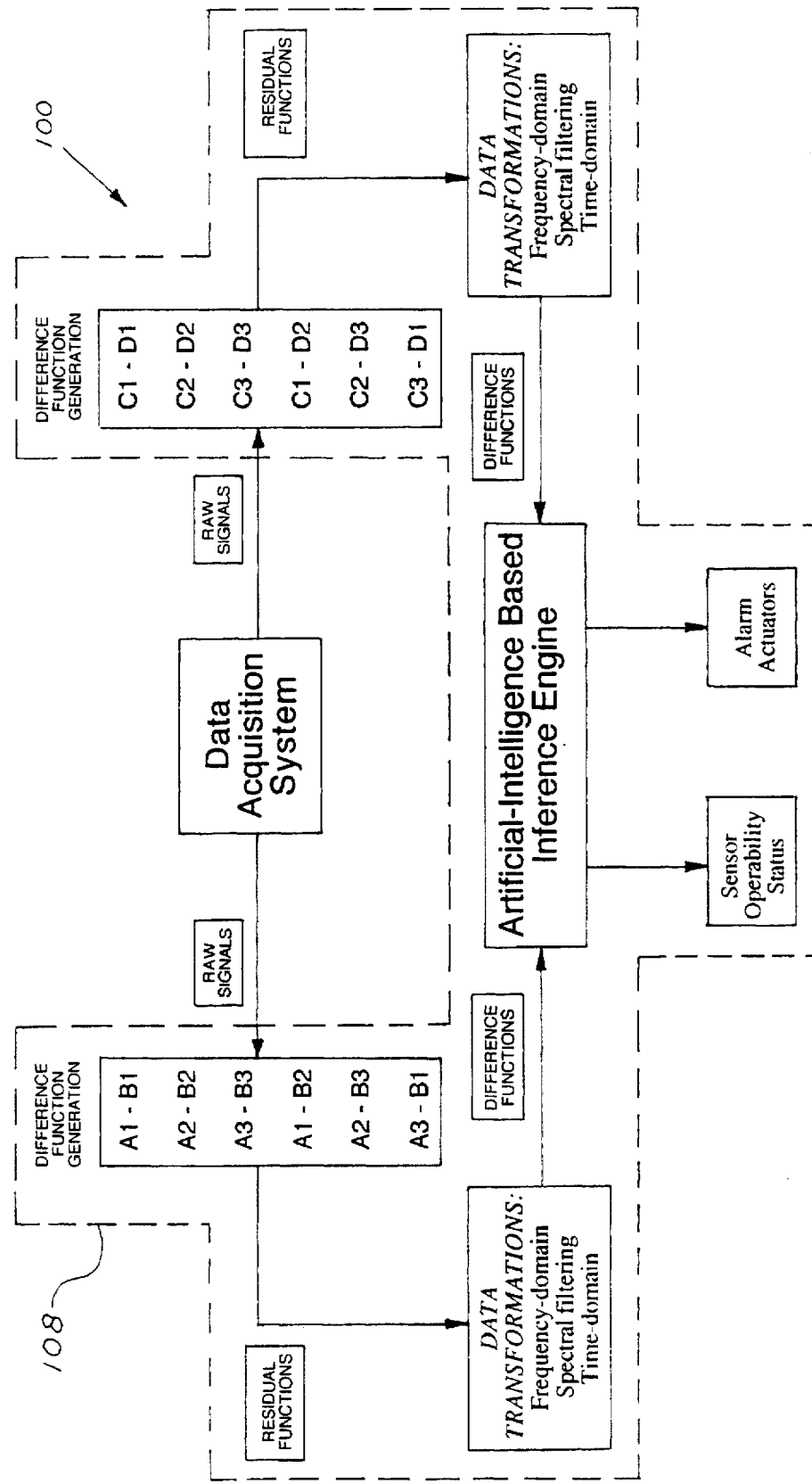
FIG. 12 illustrates triply-redundant sensors monitoring one physical variable for three industrial devices.
Figure 13I:
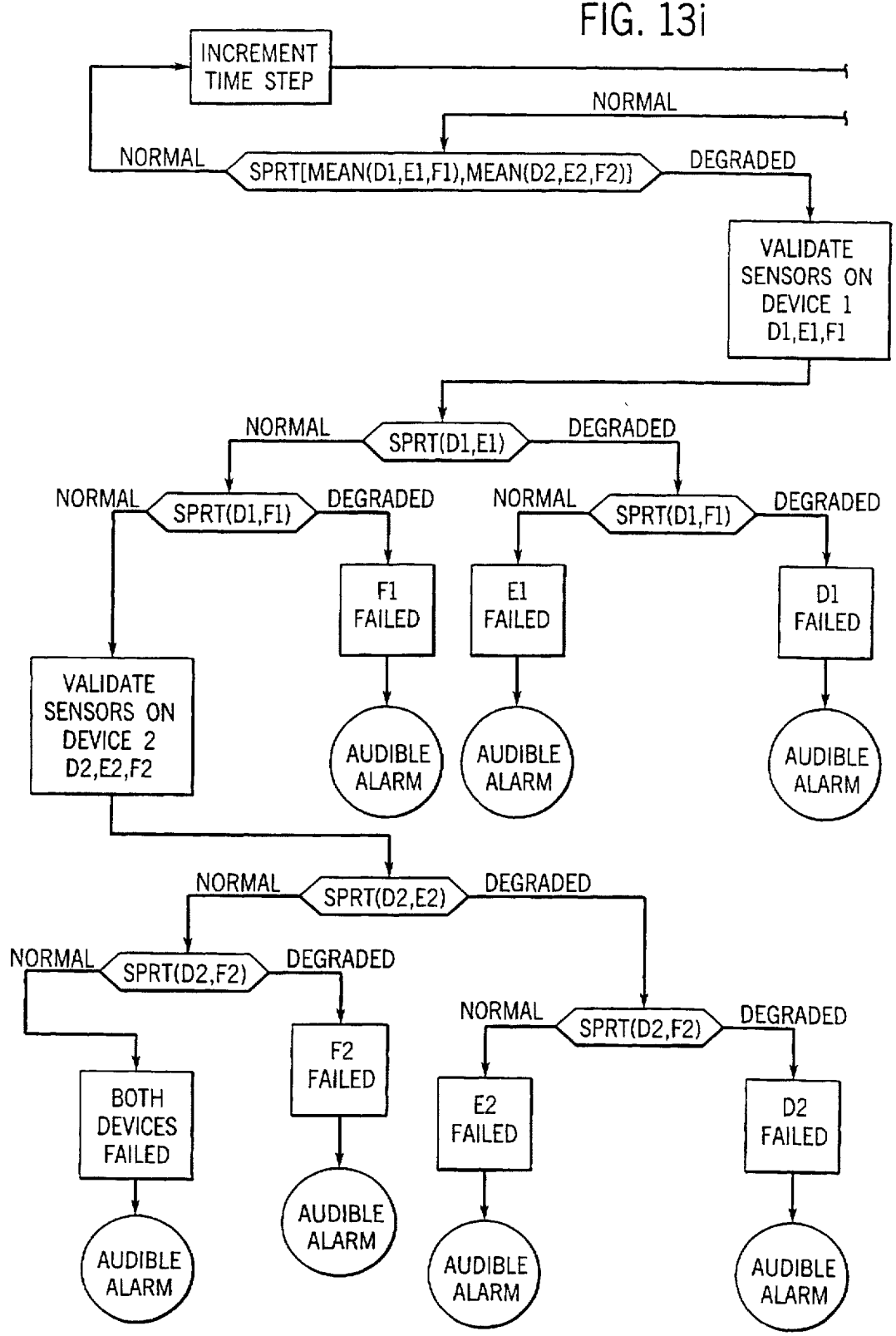
FIG. 13 illustrates a logic diagram and conditional branching structure for an equipment surveillance module.
Figure 13I:
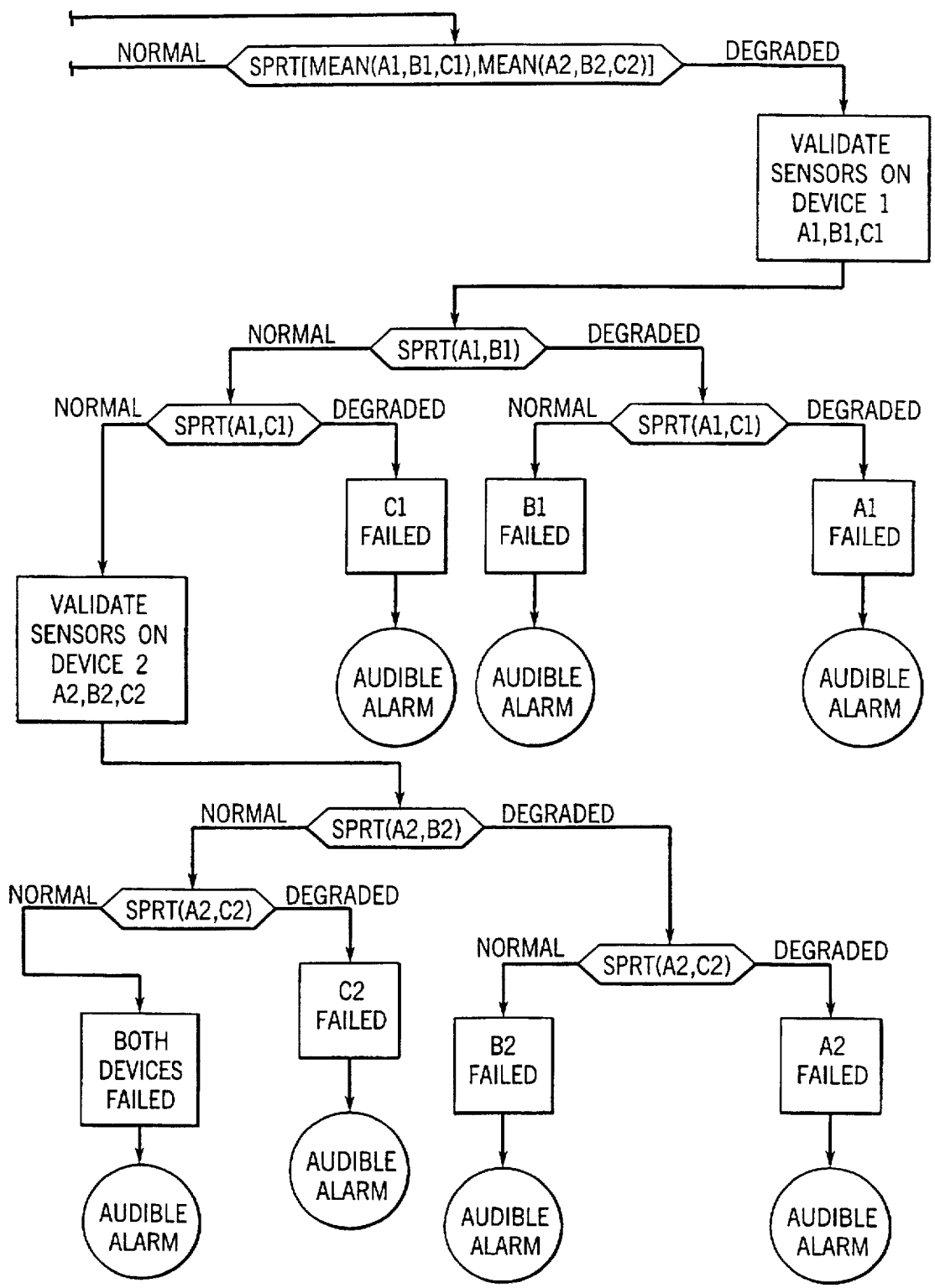

The expert system 100 embodies the logic rules that convey to the operator the status of the sensors 104 and the industrial devices 106 connected to a SPRT network 108 (see FIG. 12). When one or more of the SPRT modules 102 indicate a disturbance in sensor signals (i.e., the SPRT modules 102 trip) the expert system 100 determines which of the sensors 104 and/or the devices 106 are affected. The expert system 100 is designed to work with any network of the SPRT modules 102, encompassing any number of the industrial devices 106, process variables, and redundant ones of the sensors 104.

In a most preferred embodiment, the expert system 100 is operated using computer software written in the well known "LISP" language (see Appendix B attached hereto). In this embodiment, the expert system 100 is divided into two segments which act as pre- and post-processors for the SPRT module computer code. The pre-processor section is used to set up operation of the SPRT network 108 and forge connections between the sensor data stream and the SPRT modules 102. The post-processor section contains the logic rules which interpret the output of the SPRT modules 102.

The logic for the expert system 100 depends upon the grouping of the SPRT modules 102. Each of the SPRT modules 102 monitors two identical sensors 104 which measure a physical process variable. (See FIGS. 9–11.) The two sensors can either be redundant sensors 104 on one of the industrial devices 106 or separate sensors 104 on two identical ones of the industrial devices 106 that are operated in parallel. A group of the modules 102 entails all of the connections between the identical sensors 104 for a given physical variable on a group of the industrial devices 106. The number of the modules 102 in a group depends upon the number of identical devices 106 that are operated in parallel and the number of redundant sensors 104 on each device 106 which observe the response of a physical variable. For instance, suppose the expert system 100 is to be applied to an industrial system which contains three identical coolant pumps (not shown). Furthermore, suppose each coolant pump contains two redundant pressure transducers and one thermocouple (not shown). This system 100 would be modeled by two groups of the modules 102. The first group of the modules 102 would connect the six total pressure transducers which measure pump pressure. The second group of the modules 102 would connect the three total thermocouples which measure coolant temperature. For a given group of related sensors 104, the data from each of the sensors 104 are fed into the modules 102. Since the module 102 performs a comparison test between the two sensors 104, the tripping of both of the modules 102 connected to the sensor 104 (in the absence of other tripped modules 102 in the same group) is a necessary and sufficient condition to conclude that the sensor 104 has failed. Therefore, for a group of related sensors 104, the minimum number of modules 102 needed to enable sensor detection is the same as the number of the sensors 104 in the group. For the example discussed above, the number of the modules 102 in the first group would be six, and the number of the modules 102 in the second group would be three.

In applications involving two or more identical ones of the industrial devices 106 operated in parallel and equipped with identical sensors 104, the module 102 applied to pairs of the sensors 104 monitoring the same physical process on the respective devices 106 will provide sensitive annunciation of any physical disturbance affecting one of the devices 106. If each of the devices 106 has only one of the sensors 104 though, it would not be possible for the expert system 100 to distinguish between device degradation and sensor degradation. In this case, the primary benefit of the method would derive from its very early annunciation of a disturbance. For cases in which each of the industrial devices 106 is equipped with multiple, redundant sensors 104, the modules 102 can be applied to pairs of the sensors 104 on each of the industrial devices 106 for sensor-operability verification. In this case, the expert system 100 not only provides early annunciation of a disturbance, but can also distinguish between device degradation and sensor degradation. Moreover, when the expert system 100 determines that the cause of the discrepant signals is due to a degraded one of the sensors 104, it can identify the specific sensor 104 that has failed.

Figure 9:
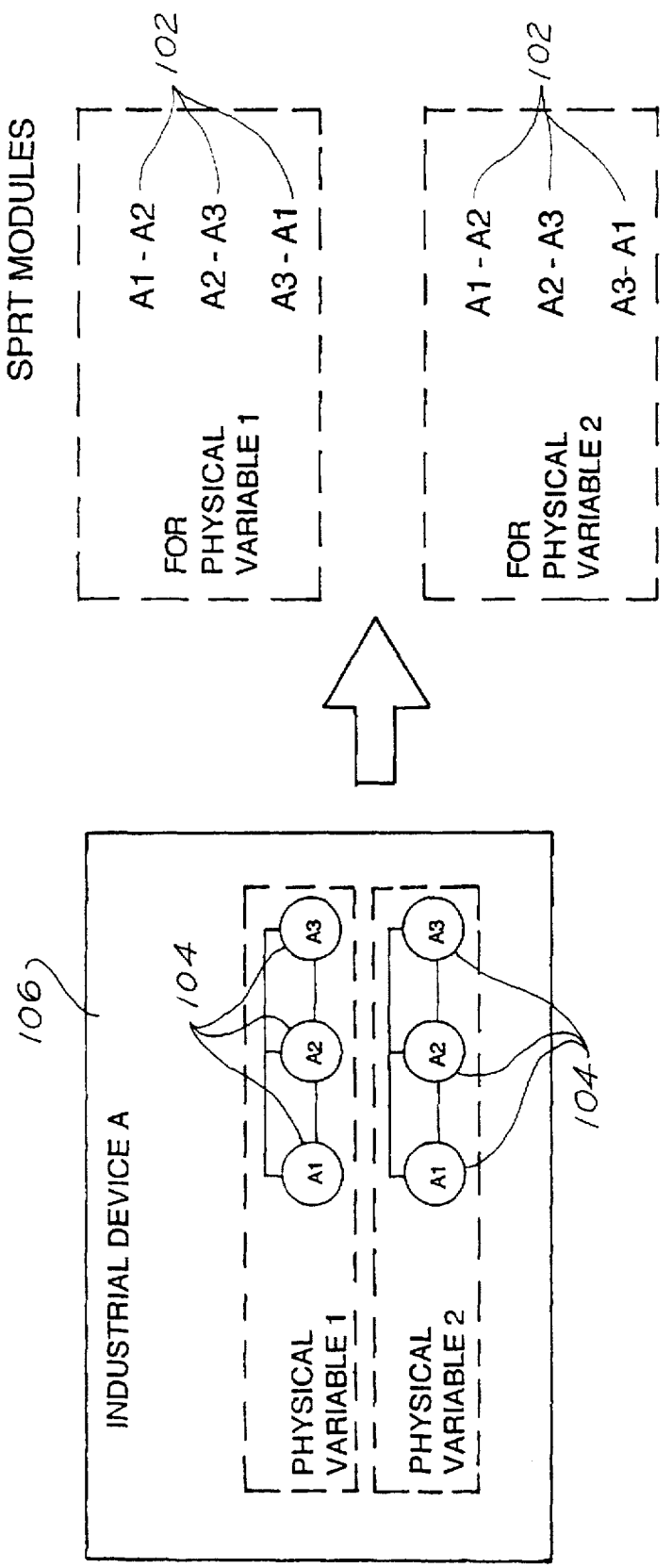
FIG. 9 illustrates a plurality of sensors monitoring two physical variables of a single industrial device.
Figure 10:
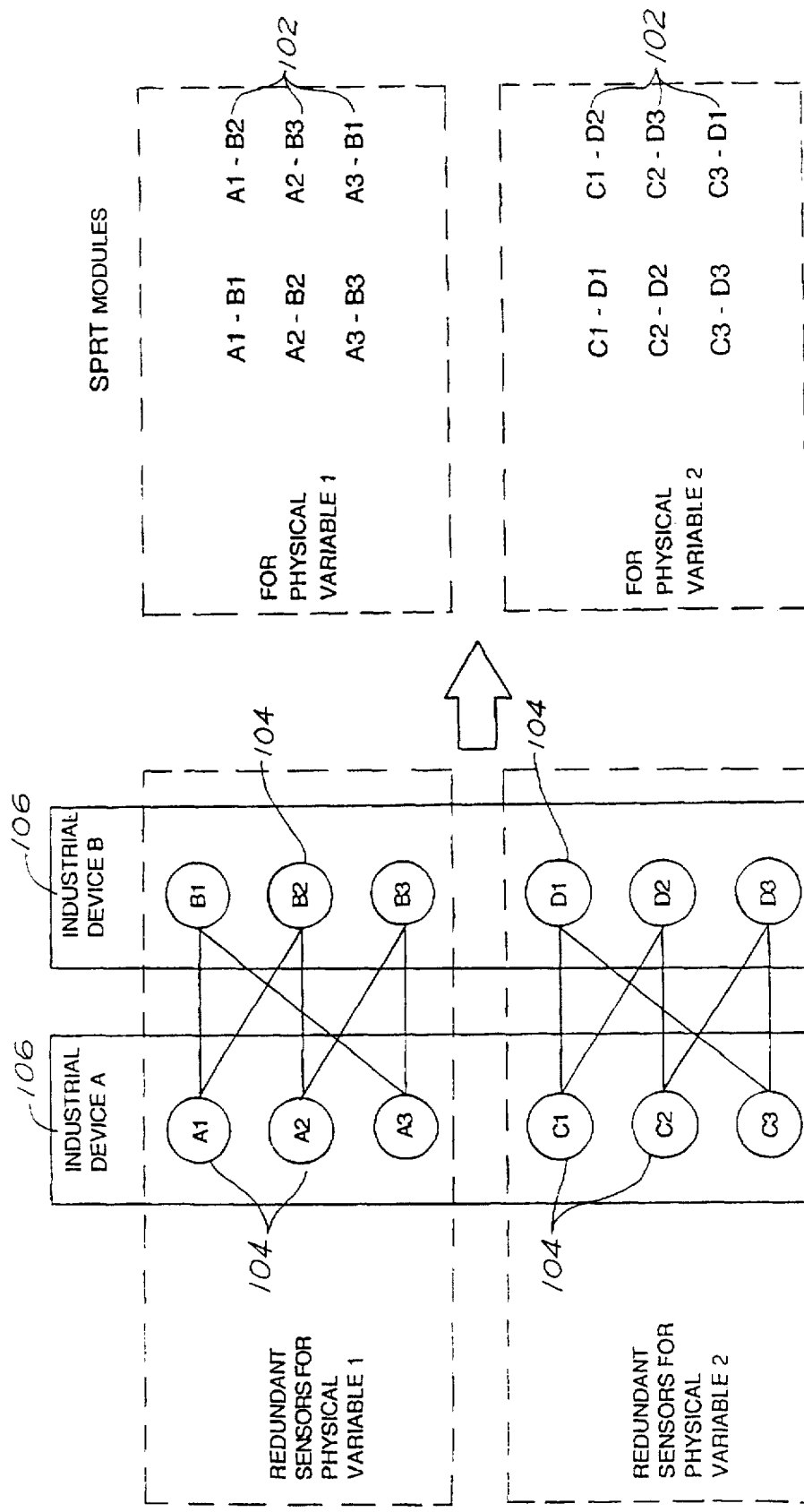
FIG. 10 illustrates triply-redundant sensors monitoring two physical variables for two industrial devices.
Figure 11:
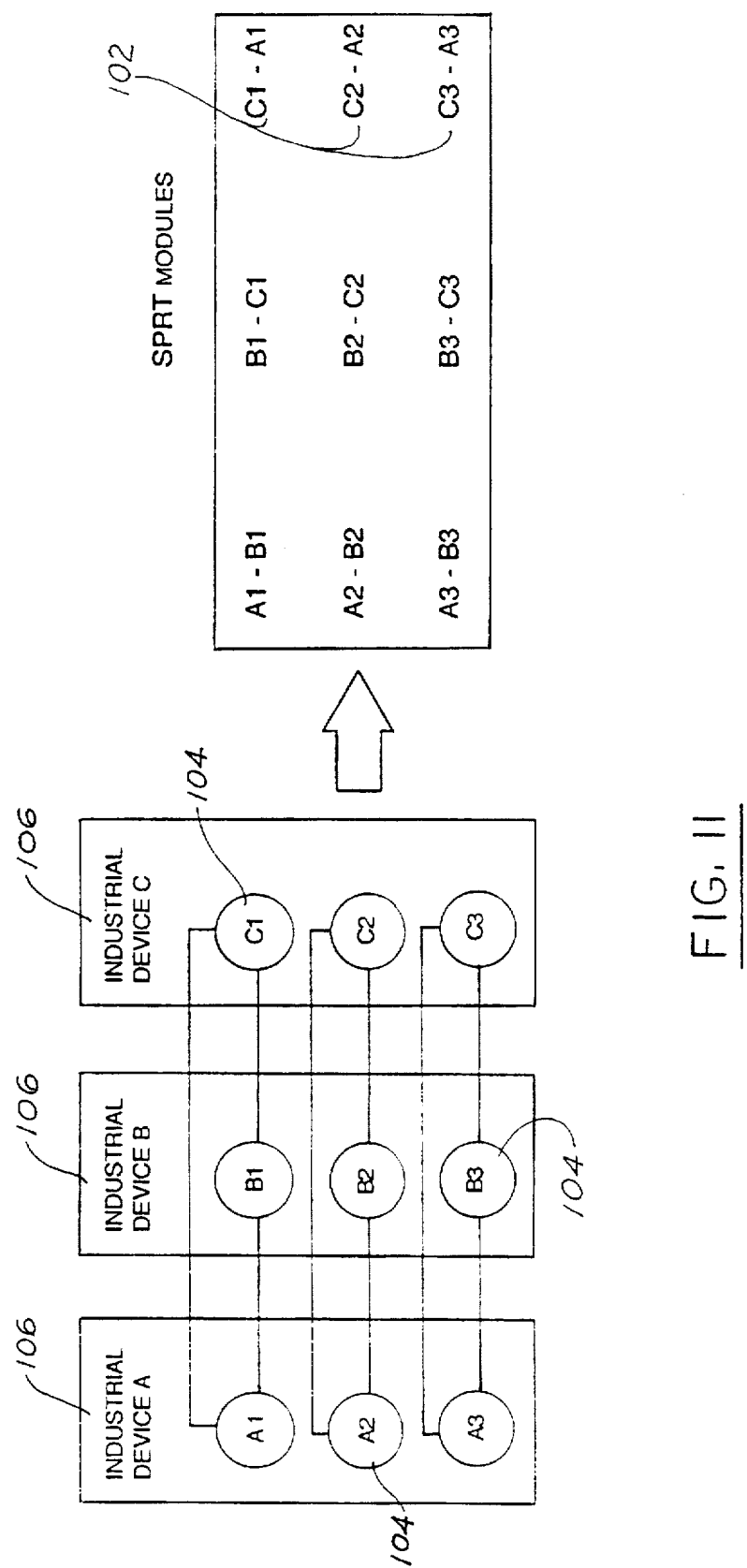
FIG. 11 illustrates an overall system structure employing the sensor array of FIG. 10.

FIG. 9 illustrates the first stage of the expert system 100 processing for a simple generic application involving a single one of the industrial devices 106 that is equipped with triply-redundant sensors 104 for measurement of two physical variables. The expert system 100 first identifies the minimum unique set of signal pairs that will be needed for the network of interacting modules 102. FIG. 10 illustrates a generic application involving two of the industrial devices 106 that are operated in parallel. For this example, it is also assumed that triply-redundant sensors 104 are available for measuring each of two separate physical variables. Once again, the expert system 100 identifies the pair-wise sensor combinations that it uses in building the conditional branching hierarchy for the module configuration. FIG. 11 illustrates a generic application involving three industrial devices 106 that are operated in parallel. Triply-redundant sensors 104 for measuring one physical variable are assumed. The figure shows the pair-wise sensor combinations identified by the expert system 100 for building the conditional branching hierarchy. These figures also depict the three main branches for the logic rules contained in the expert system 100: a grouping of the modules 102 based on a single one of the industrial devices 106, two identical devices 106 operated in parallel or multiple (three or more) devices 106 operated in parallel. The expert system 100 however is not limited to only one of the three cases at a time. The industrial system 100 modeled can contain any number of independent single devices 106, doubly-redundant devices 106 and multiply-redundant devices 106. Each device group, in turn, may contain any number of redundant sensors 104 and any number of physical variables.

The expert system 100 is implemented using a stand-alone computer program set forth in the previously referenced Appendix B. In operation after the program initialization information has been gathered, the computer program prompts the user for the name of a data file that simulates the real-time behavior of the SPRT network 108 connected to the system 100 including the industrial devices 106. The SPRT data file contains space-delimited data values that represent the status of a corresponding module 102. The module 102 has two states: a 0 (non-tripped) state indicates that the signals from the sensors 104 monitored by the module 102 have not diverged from each other, while a 1 (tripped) state indicates that the signals from the sensors 104 monitored by the module 102 have diverged from each other enough to be detected by the SPRT algorithm. Each line of data in the file represents the status of a group of related modules 102 at a given time. Each line contains a list of 0's and 1's that correspond to the state of all the modules 102 in the group. The number of groups in the network 108 depends upon the number of groups of identical devices 106 and the number of process variables monitored on each group of devices 106. If the network 108 contains more than one group of related modules 102, the data file will contain a corresponding number of lines to represent the status of all the modules 102 in the network 108 at a given time. For instance, if a system of the industrial devices 106 is modeled by four SPRT groups, the output file will contain four lines of SPRT data for each timestep in the simulation.

Execution of the program of Appendix B includes two procedures. The first procedure (SPRT_Expert) provides the instructions for the control of program execution and corresponds to the pre-processor section in an integrated SPRT expert system/SPRT module code. When executed, the procedure first prompts the user to specify the number of device groups in the application. A device group is a group of identical industrial devices 106 (one or more) that are operated in parallel and are equipped with redundant ones of the sensors 104. A device group can contain one or more physical variables. The program then prompts the user for the following information for each of the device groups:

(i) The name of the device group.

(ii) The number of physical variables in the device group.

(iii) The name of the first physical variable in the device group.

(iv) The number of redundant sensors 104 on each device 106 that measures the first physical variable.

If the device group contains more than one physical variable, the program will loop through steps (iii) and (iv) to obtain input data for the remaining physical variables. The number of SPRT groups in the application is equal to the sum of the number of physical variables for each of the device groups. Namely, $$N_{SPRT\ Groups} = \sum_{i=1}^{N_{Device\ Groups}} N_{Physical\ Variables_i}$$

Once the program has collected the required data to set up the system, it prompts the user for the name of the SPRT data file. Execution of the program consists of reading the SPRT status values from the data file and evaluating the status of the devices 106 and sensors 104 in the application, as inferred from the SPRT data. Program execution is controlled by a "do" loop. For each pass through the loop, the program reads the data which model the state of each of the SPRT modules 102 in the network at a given time. The SPRT data are then passed to the Analyze procedure. If any of the SPRT modules 102 in the application has tripped (i.e., SPRT value=1), the Analyze procedure determines which device(s) 106 and/or sensor(s) 104 are affected and reports their status. Looping continues until the end of the data file is reached, upon which the program terminates.

The Analyze procedure contains the logic rules for the expert system 100. It corresponds to the post-processor section in an integrated SPRT expert system/SPRT module code. It is passed lists of 0's and 1's that represent the status of the SPRT modules 102 at any given timestep of the SPRT program. The number of lists passed to Analyze equals the number of SPRT groups. For each SPRT group, the procedure converts the SPRT data into a list of tripped SPRT modules 102. From the list of tripped SPRT modules 102, the status of the devices 106, and the sensors 104 modeled by the SPRT group are evaluated. Based on the number of devices 106 and the redundant sensors 104 in a SPRT group, the expert system 100 can determine which of the device(s) 106 and/or the sensors(s) 104 have failed. In some cases (e.g., if the number of the tripped modules 102 is one, or if the number of redundant sensors 104 in a group is one), the expert system 100 cannot conclude that the device 106 or the sensor 104 has failed, but can only signal that device or sensor failure is possible. Within Analyze, the logic rules are encapsulated by three procedures: SingleDevice, for a SPRT group applied to a single one of the industrial devices 106, DualDevice, for a SPRT group applied to two parallely-operated industrial devices 106; and MultipleDevice, for a SPRT group applied to a group of three or more parallely-operated industrial devices 106.

The following nonlimiting example is illustrative of implementation of the expert system.

EXAMPLE

Figure 14:
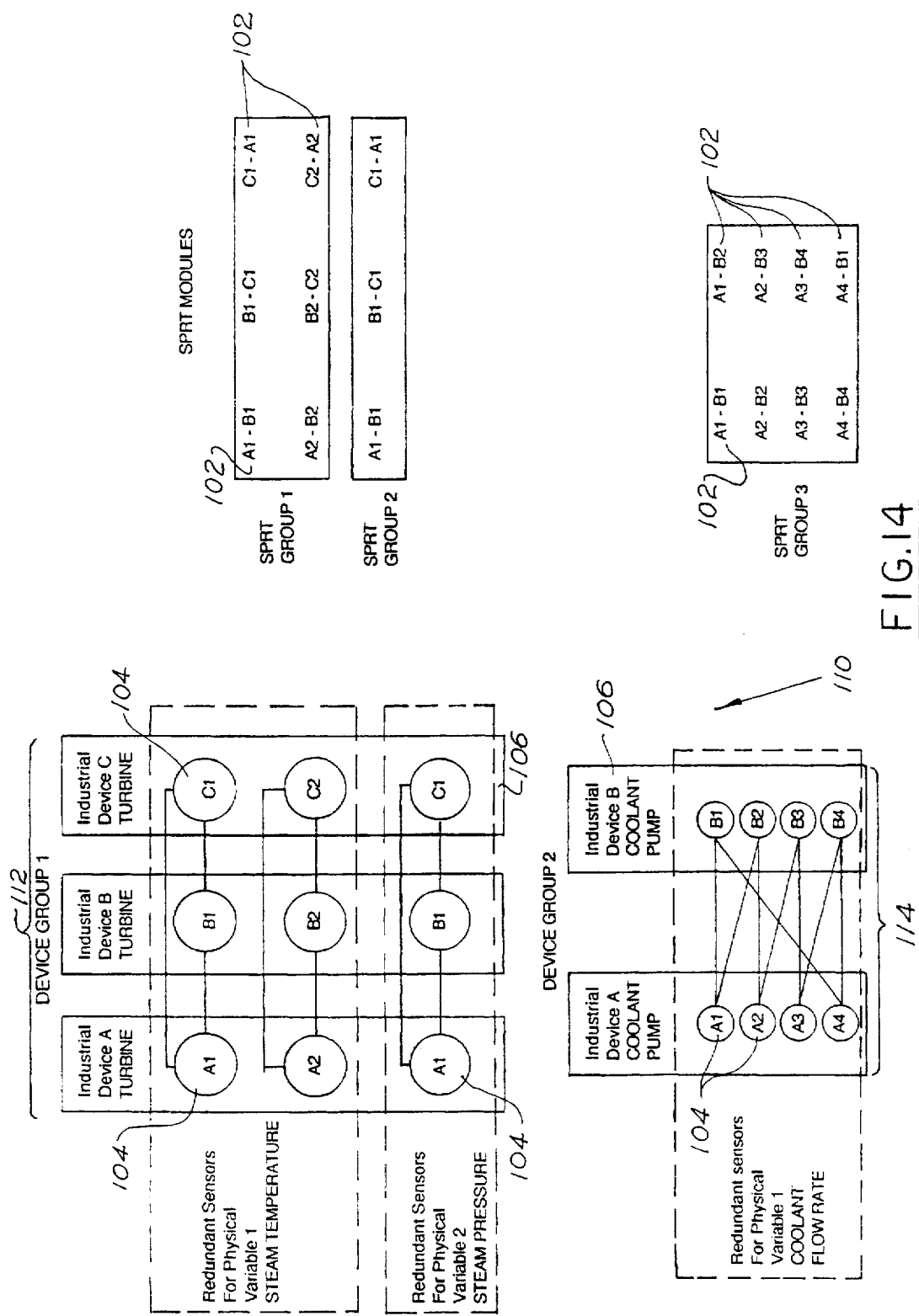
FIG. 14 illustrates a system of industrial devices and development of SPRT modules for monitoring the system.

The development of a network of the SPRT modules 102 for a general system 110 of the industrial devices 106 and the action of the corresponding logic rules are revealed by an example calculation. The system 110 of industrial devices 106 and a data file representing the transient behavior of the sensors 104 in the system 110 were created. A diagram of the system 110 is shown in FIG. 14 and contains two groups of the industrial devices 106. A first group 112 (identified as turbine devices) contains three of the identical devices 106. Each turbine is equipped with the sensors 104 to measure the steam temperature and steam pressure physical variables. There are two redundant sensors 104 on each turbine reading the steam temperature, while one of the sensors 104 measures the steam pressure. A second device group 114 consists of two coolant pumps. One physical variable, coolant flowrate, is gauged on each coolant pump by a group of four redundant sensors 104. The corresponding network of SPRT modules 102 for the system 110 is shown. Three groups of the SPRT modules 102 are required; with six of the modules 102 in a first module group for the steam temperature sensors on the turbines, three modules 102 in the second module group for the steam pressure sensors 104 on the turbines, and eight of the modules 102 in the third group of the modules 102 for the coolant flowrate sensors 104 on the coolant pumps.

A complete listing of the output from the test run follows hereinafter. Input entered by the user is identified by bold type. From the PC-Scheme prompt, the program is executed by first loading it into memory, and then calling the main procedure (SPRT_Expert). After displaying a title banner, the code asks the user to specify the number of device groups in the network.

[2] (load "SPRTEXPT.S")
OK
[3] (SPRT_Expert)
SPRT Expert System Simulation Program
Enter the number of device groups→2
For each device group in the network, the program requests that the user supply the name of the devices in the group, the number of identical devices, the number of physical variables in the device group, and the names and numbers of redundant sensors for each physical variable. The input entered for device group #1 is:
DEVICE NAME:
Enter the name of device group number 1→TURBINE
DEVICE NUMBER:
Enter the number of devices in the TURBINE device group→3

PHYSICAL VARIABLE NUMBER:
Enter the number of physical variables in the TURBINE device group→2

PHYSICAL VARIABLE NAME:
Enter the name of physical variable number 1 of the TURBINE device group→STEAM TEMPERATURE

SENSOR NUMBER:
Enter the number of redundant sensors for the STEAM TEMPERATURE physical variable in the TURBINE device group→2

PHYSICAL VARIABLE NAME:
Enter the name of physical variable number 2 of the TURBINE device group→STEAM PRESSURE

SENSOR NUMBER:
Enter the number of redundant sensors for the STEAM PRESSURE physical variable in the TURBINE device group→1

The input entered for device group #2 is:

DEVICE NAME:
Enter the name of device group number 2→COOLANT PUMP

DEVICE NUMBER:
Enter the number of devices in the COOLANT PUMP device group→2
PHYSICAL VARIABLE NUMBER:
Enter the number of physical variables in the COOLANT PUMP device group→1

PHYSICAL VARIABLE NAME:
Enter the name of physical variable number 1 of the COOLANT PUMP device group→COOLANT FLOWRATE
SENSOR NUMBER:
Enter the number of redundant sensors for the COOLANT FLOWRATE physical variable in the COOLANT PUMP device group→4

Once the input data for each device group have been obtained, the program displays a summary of the SPRT network, by identifying the SPRT groups in the network. The number of SPRT Groups in the simulation is 3.

SPRT Group #1
contains 3 TURBINE industrial devices with 2 STEAM TEMPERATURE redundant sensors.

SPRT Group #2
contains 3 TURBINE industrial devices with 1 STEAM PRESSURE redundant sensor.

SPRT Group #3
contains 2 COOLANT PUMP industrial devices with 4 COOLANT FLOWRATE redundant sensors.

The final input item required is the name of the data file containing the status values for the SPRT modules in the network.
Enter filename for SPRT data→TEST.DAT
The analysis of the SPRT data is controlled by a do loop. For each pass through the loop, the program retrieves a line of data for each SPRT group in the network. Each block of data retrieved from the file represents the status of all SPRT modules in the network at a moment in time. The program analyzes each block of data to determine whether the SPRT status values imply device and/or sensor failures.
In the test calculation, the first block of data retrieved from the TEST.DAT file is:
000000
000
00000000
Analyzing this data, the program reports that:
Analyzing SPRT data set number 1

SPRT Group #1:
No SPRTs have tripped.

SPRT Group #2:
No SPRTs have tripped.

SPRT Group #3:
No SPRTs have tripped.

The second block of data retrieved from the file contains some tripped SPRT modules:
100000
000
01000000
Since only one module has tripped in SPRT groups #1 and #3, the program can conclude only that some device and/or sensor failures may have occurred. The program identifies which modules have tripped and which devices or sensors are affected.
Analyzing SPRT data set number 2

SPRT Group #1:
For the STEAM TEMPERATURE physical variable of the TURBINE devices:
These 1 of the 6 SPRTs have tripped→A1-B1
*DEVICE NUMBER A OR DEVICE NUMBER B OF THE TURBINE DEVICES, SENSOR NUMBER A1, OR SENSOR NUMBER B1 MAY BE FAILING*

SPRT Group #2:
No SPRTs have tripped.
SPRT Group #3:

For the COOLANT FLOWRATE physical variable of the COOLANT PUMP devices:
One SPRT has tripped→A1-B2
*ONE OR BOTH OF THE COOLANT PUMP DEVICES, SENSOR NUMBER A1 OR SENSOR NUMBER B2 MAY BE FAILING*
In the third block of data, additional modules have tripped.
100100
001
01100000

In SPRT group #1, two modules have tripped. Since both of the sensors on device A and both of the sensors on device B are affected, the code concludes that one of the two devices has failed. It cannot identify which of the devices has failed at this time though. In SPRT group #2, one module has tripped. The code concludes that one of the sensors or devices may be failing. Since both modules connected to sensor B2 in SPRT group #3 have tripped, the code concludes that sensor B3 has failed.

Analyzing SPRT data set number 3

SPRT Group #1:
For the STEAM TEMPERATURE physical variable of the TURBINE devices:
These 2 of the 6 SPRTs have tripped-A1-B1 A2-B2
*DEVICE NUMBER A OR DEVICE NUMBER B OF THE TURBINE DEVICES HAS FAILED*

SPRT Group #2:
For the STEAM PRESSURE physical variable of the TURBINE devices:
These 1 of the 3 SPRTs have tripped-C1-A1
*DEVICE NUMBER C OR DEVICE NUMBER A OF THE TURBINE DEVICES, SENSOR NUMBER C1, OR SENSOR NUMBER A1 MAY BE FAILING*

SPRT Group #3:
For the COOLANT FLOWRATE physical variable of the COOLANT PUMP devices:
These 2 of the 8 SPRTs have tripped-A1-B2 A2-B2
*SENSOR NUMBER B2 HAS FAILED*

More modules have tripped in the fourth block of data.
101100
011
01100100

Since three of the four modules connected to the sensors in device A of SPRT group #1 have tripped, the code concludes that device A has failed. In SPRT group #2, two of the three modules have tripped. But since there is only one sensor per device in this group, the code can only conclude that either a device or sensor failure has occurred. In SPRT group #3, three modules have tripped. The code concludes that one of the two devices has failed.

Analyzing SPRT data set number 4

SPRT Group #1:
For the STEAM TEMPERATURE physical variable of the TURBINE devices:
These 3 of the 6 SPRTs have tripped→A1-B1 C1-A1 A2-B2
*DEVICE NUMBER A OF THE TURBINE DEVICES HAS FAILED*

SPRT Group #2:
For the STEAM PRESSURE physical variable of the TURBINE devices:
These 2 of the 3 SPRTs have tripped→B1-C1 C1-A1
*DEVICE NUMBER C OF THE TURBINE DEVICES, OR SENSOR NUMBER C1 HAS FAILED*

SPRT Group #3:
For the COOLANT FLOWRATE physical variable of the COOLANT PUMP devices:
These 3 of the 8 SPRTs have tripped→A1-B2 A2-B2 A3-B4
*ONE OR BOTH OF THE COOLANT PUMP DEVICES HAVE FAILED*

Notice that two of the tripped modules in SPRT group #3 implicate a failure of sensor B2, the conclusion reached by the analysis of the third block of data. But since an additional module has tripped, the code changes its conclusion from a sensor failure to a failure of one or both of the devices. Although the third module trip may be a spurious trip (i.e., the SPRT modules have a finite false alarm probability) which would mean that the earlier conclusion still holds, the code conservatively concludes that none of the trips are spurious and decides that a device failure has occurred. The code assumes that no module trip is spurious, which causes the code to consistently pick the most conservative conclusion when more than one conclusion can be deduced from the data.

The fifth and last set of data in the file contains additional module trips.
111100
111
01100110

The additional trips in SPRT group #1 cause the code to conclude that more than one device in the group is affected. In SPRT group #2, all three modules in the group have tripped. Whenever all SPRT modules in a group trip, the code concludes that all devices in the group have failed. In SPRT group #3 the additional module trip does not change the conclusion, since the worst-case conclusion (i.e., one or both of the devices in the group have failed) for the group has already been reached.

Analyzing SPRT data set number 5

SPRT Group #1:
For the STEAM TEMPERATURE physical variable of the TURBINE devices:
These 4 of the 6 SPRTs have tripped→A1-B1 B1-C1 C1-A1 A2-B2
*DEVICE NUMBER B OF THE TURBINE DEVICES HAS FALED*
*SENSOR NUMBER C1 HAS FAILED*
*DEVICE NUMBER A OF THE TURBINE DEVICES HAS FALED*

SPRT Group #2:
For the STEAM PRESSURE physical variable of the TURBINE devices:
All 3 SPRTs have tripped
*ALL 3 OF THE TURBINE DEVICES HAVE FAILED*

SPRT Group #3:
For the COOLANT FLOWRATE physical variable of the COOLANT PUMP devices: These 4 of the 8 SPRTs have tripped→A1-B2 A2-B2 A3-B4 A4-B4
*ONE OR BOTH OF THE COOLANT PUMP DEVICES HAVE FAILED*

Notice that the SPRT group #1, the code concludes that devices A and B have failed, but for device C it concludes that only one of its sensors has failed. For device groups containing multiple devices (i.e., three or more identical devices), the code applies its logic rules to each of the devices independently. Since for devices A and B both of their sensors are involved, the code concludes that the devices have failed. For device C only the first sensor is involved, thus the code concludes that only the first sensor on the device has failed. The code reaches the end of the file after analyzing the fifth block of data, causing the code to terminate. For SPRT group #3, a failure of one or both of the devices is indicated, although the pattern of tripped modules can also be interpreted as a simultaneous failure of sensors B2 and B4. The code indicates a device failure because concurrent failures of two or more sensors in a group is deemed to be highly improbable.

While preferred embodiments of the invention have been shown and described, it will be clear to those skilled in the art that various changes and modifications can be made without departing from the invention in its broader aspects as set forth in the claims provided hereinafter.

What is claimed is:

1. A method of testing both an industrial process and a sensor for determining fault conditions therein, comprising the steps of:

determining automatically, using computer means, a configuration of a minimum number of sensor pairs needed to test the industrial process and the sensor for state of operation;

operating at least a first and second sensor to form at least one sensor pair to redundantly detect at least one physical variable of the industrial process to provide a first signal from said first sensor and a second signal from said second sensor, each said signal being characteristic of the one physical variable;

obtaining a difference function characteristic of the arithmetic difference pairwise between said first signal and said second signal at each of a plurality of different times of sensing the one physical variable;

obtaining a frequency domain transformation of said first difference function to procure Fourier coefficients corresponding to Fourier frequencies;

generating a composite function over time domain using the Fourier coefficients;

obtaining a residual function over time by determining the arithmetic difference between the difference function and the composite function, the residual function being substantially free of serially correlated noise;

operating on the residual function using the computer means for performing a statistical analysis technique to determine whether an alarm condition is present in at least one of the industrial process and the sensor, the residual function including white noise characteristics of an uncorrelated function of reduced skewness relative to the difference function and being input to the statistical analysis technique; and said at least one sensor pair providing alarm information to an operator of the industrial process allowing modification of at least one of the industrial process and said at least first and second sensor when an alarm condition is detected.

2. The method described is claim 1 wherein said computer means comprises an artificial intelligence system.

3. The method as defined in claim 1 wherein the residual function comprises reduced Markov dependent noise.

4. The method as defined in claim 1 wherein the industrial process comprises at least one of a chemical process, a mechanical process and an electrical operational process.

5. The method as defined in claim 1 wherein the step of obtaining Fourier coefficients comprise iteratively determining the minimum number of Fourier harmonics able to generate the composite function.

6. The method as defined in claim 1 further including at least one of the steps of modifying the industrial process or changing the sensor responsive to the alarm condition.

7. A method of testing both an industrial process and a sensor for determining fault conditions therein, comprising the steps of:

determining, using computer means, a configuration of a minimum number of sensor pair signals needed to characterize the industrial process and the sensor state of operation;

operating at least a first sensor to detect at least one physical variable of the industrial process to provide a real signal from said first sensor;

generating an artificial signal characteristic of the one physical variable;

forming a sensor pair signal from said real signal and said artificial signal;

obtaining a difference function characteristic of the difference pairwise between said real signal and said artificial signal at each of a plurality of different times of sensing the one physical variable;

obtaining a frequency domain transformation of said difference function;

generating a composite function over a time domain;

obtaining a residual function over time by determining the difference between the frequency transformed difference function and the composite function;

operating on the residual function using the computer means for performing a statistical analysis technique to determine whether an alarm condition is present in at least one of the industrial process and the first sensor, the residual function including white noise characteristics of an uncorrelated signal of reduced skewness relative to the difference function and being input to the statistical analysis technique; and said first sensor providing alarm information to an operator of the industrial process allowing modification of at least one of the industrial process and the first sensor when an alarm condition is detected.

8. The method as defined in claim 7 wherein the step of obtaining a frequency domain transformation comprises performing a Fourier transformation.

9. The method as defined in claim 7 wherein the steps of obtaining a composite function over time comprises performing an auto regressive moving average analysis.

10. The method as defined in claim 7 further including the step of determining a difference function for both the artificial signal and the real signal, as well as a separate pair of real signals.

11. The method as defined in claim 7 wherein the residual function comprises reduced Markov dependent noise.

12. The method as defined in claim 8 wherein the step of obtaining a frequency domain transformation comprises obtaining Fourier coefficients iteratively to determine the minimum number of Fourier harmonics able to generate the composite function.

13. A system for automatically configuring sensors for testing both an industrial process and a sensor for determining a fault condition therein, comprising:

computer means for automatically configuring a minimum number of sensor pair signals needed to characterize the industrial process and the sensor state of operation;

at least a first sensor to detect at least one physical variable of the industrial process to provide a first signal from said first sensor;

first means for generating a second sensor signal for comparison with said first signal from said first sensor;

second means for determining a difference function characteristic of the arithmetic difference pairwise between said first signal and said second signal at each of a plurality of different times of sensing the one physical variable;

third means for obtaining a residual function over time by means for determining the arithmetic difference between the difference function and the composite function, the residual function including white noise characteristics of an uncorrelated signal of reduced skewness;

fourth means for operating on the residual function, said fourth means including the computer means for executing a computer program for performing a statistical analysis technique and for determining whether an alarm condition is present in at least one of the industrial process and the sensor and with said second means, said third means, and said fourth means cooperatively providing a function comprised of said white noise characteristics of uncorrelated signal of reduced skewness relative to the difference function as an input to the statistical analysis technique; and means for providing information allowing modification of at least one of the industrial process and the sensor when an alarm condition is detected.

14. The system as defined in claim 13 further including means for obtaining a frequency domain transformation of said difference function.

15. The system as defined in claim 13 wherein said computer means comprises an artificial intelligence system.

16. The system as defined in claim 13 wherein said means for generating a second signal comprises the computer means for executing a computer program.

17. The system as defined in claim 16 wherein the computer program includes an autoregressive moving average procedure.

18. The system as defined in claim 13 wherein the system includes at least one pair of sensors for detecting each of the physical variables.

19. The system as defined in claim 13 wherein said computer means executes a computer program including a statistical probability ratio test on the residual function.

20. The system as defined in claim 13 further including means for changing at least one of the industrial process and substituting another sensor for a defective sensor.

* * * * *